(12) United States Patent
Suzuki et al.

(10) Patent No.: US 8,076,567 B2
(45) Date of Patent: Dec. 13, 2011

(54) MUSIC PIECE REPRODUCING APPARATUS AND MUSIC PIECE REPRODUCING METHOD

(75) Inventors: Shiro Suzuki, Kanagawa (JP); Chisato Kemmochi, Kanagawa (JP); Shusuke Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 12/372,120

(22) Filed: Feb. 17, 2009

(65) Prior Publication Data

US 2009/0249942 A1 Oct. 8, 2009

(30) Foreign Application Priority Data

Apr. 7, 2008 (JP) ................................. 2008-099166

(51) Int. Cl.
*G10H 1/00* (2006.01)
(52) U.S. Cl. ................. 84/616; 84/602; 84/603; 84/615; 84/634
(58) Field of Classification Search .................... 84/616
See application file for complete search history.

(56) References Cited

U.S. PATENT DOCUMENTS

| | | | | |
|---|---|---|---|---|
| 5,471,009 | A | * | 11/1995 | Oba et al. ..................... 84/645 |
| 2004/0244568 | A1 | | 12/2004 | Nakabo et al. |
| 2005/0097075 | A1 | * | 5/2005 | Hoekman et al. .............. 707/1 |
| 2005/0129252 | A1 | | 6/2005 | Heintzman et al. |
| 2005/0195984 | A1 | * | 9/2005 | Miura et al. .................. 381/63 |
| 2005/0211077 | A1 | | 9/2005 | Kobayashi |
| 2005/0217463 | A1 | | 10/2005 | Kobayashi |
| 2006/0032357 | A1 | * | 2/2006 | Roovers et al. ................. 84/1 |
| 2007/0169613 | A1 | * | 7/2007 | Kim et al. ..................... 84/609 |
| 2008/0202321 | A1 | * | 8/2008 | Goto et al. .................... 84/616 |

FOREIGN PATENT DOCUMENTS

| | | |
|---|---|---|
| JP | 6-216974 | 8/1994 |
| JP | 2001-36604 | 2/2001 |
| JP | 2001-223767 | 8/2001 |
| JP | 2004-86189 | 3/2004 |
| JP | 2004-335065 | 11/2004 |
| JP | 2005-274708 | 10/2005 |
| JP | 2005-275068 | 10/2005 |
| JP | 2006-92430 | 4/2006 |
| JP | 2006-170753 | 6/2006 |
| JP | 2006-251054 | 9/2006 |
| JP | 2007-88521 | 4/2007 |
| JP | 2007-110481 | 4/2007 |
| JP | 2007-264584 | 10/2007 |
| JP | 2007-266803 | 10/2007 |
| WO | WO 2004/095315 A1 | 11/2004 |

* cited by examiner

*Primary Examiner* — Elvin G Enad
*Assistant Examiner* — Christopher Uhlir
(74) *Attorney, Agent, or Firm* — Oblon, Spivak, McClelland, Maier & Neustadt, L.L.P.

(57) ABSTRACT

A music piece reproducing apparatus has: a sound collecting unit collecting noise data of an ambient environment; an analyzing unit performing a frequency analysis to the noise data collected by the sound collecting unit and extracting a feature amount showing a feature of the noise data; a noise parameter database classifying the noise data every environment; and a reproducing unit reproducing music piece data which has been recorded in a recording medium and classified every category, wherein the analyzing unit classifies the noise data with reference to the noise parameter database on the basis of the extracted feature amount of the noise data, selects the previously-corresponded category of music pieces in accordance with a classification result of the noise data, and selects predetermined music piece data from music piece data classified into the selected category.

8 Claims, 23 Drawing Sheets

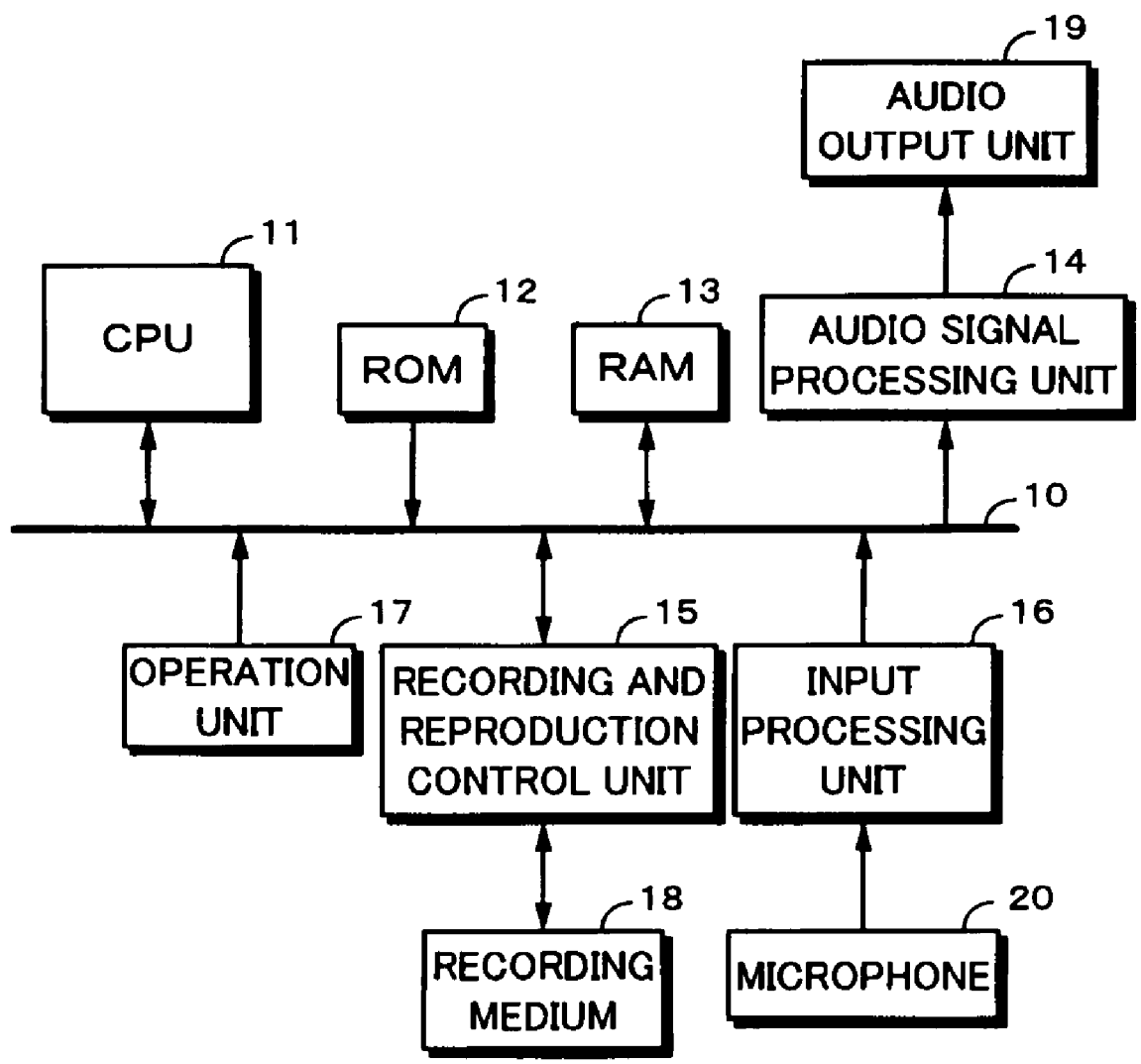

MUSIC PIECE REPRODUCING APPARATUS AND MUSIC PIECE REPRODUCING METHOD

CROSS REFERENCES TO RELATED APPLICATIONS

The present invention contains subject matter related to Japanese Patent Application JP 2008-099166 filed in the Japanese Patent Office on Apr. 7, 2008, the entire contents of which being incorporated herein by reference.

BACKGROUND OF THE INVENTION

1. Field of the Invention

The invention relates to a music piece reproducing apparatus, a music piece reproducing method, and a music piece reproducing program in which music pieces which can be easily listened to even under environmental noises are automatically selected from recorded music pieces and reproduced.

2. Description of the Related Arts

In recent years, a music reproducing apparatus in which music pieces are automatically classified into various categories and, when the user selects a desired category, the music pieces corresponding to the selected category are automatically selected and reproduced has been put into practical use. In such a kind of music reproducing apparatus, a music piece classifying method whereby feature amounts such as tempo, code progress, and the like of a music piece which each music piece has are detected and the music pieces are automatically classified into various categories on the basis of the detected feature amounts is used.

For example, a method of analyzing a music piece and detecting feature amounts such as tempo, speed feeling, and the like is disclosed in Patent Document 1 (JP-A-2005-274708). For example, a method of analyzing a signal component of each musical interval in an audio signal is disclosed in Patent Document 2 (JP-A-2005-275068).

The music reproducing apparatus in the related art will be schematically described here. FIG. 22 shows a using form of an example of a music reproducing apparatus 101 in the related art. The example shown in FIG. 22 illustrates a state where the music reproducing apparatus 101 such as a portable music reproducing apparatus or the like and headphones 102 are connected and the user is listening to music pieces recorded in the music reproducing apparatus 101 through the headphones 102. In the example, it is assumed that a plurality of music pieces have been classified into categories on the basis of the music piece classifying method in the related art and have previously been recorded in the music reproducing apparatus 101. For making an explanation easy, it is assumed here that the music pieces recorded in the music reproducing apparatus 101 have been classified into one of the two categories of "rock (that is, rock music)" and "classic (that is, classical music)". Further, with respect to the ambient environment of the user, cases of two environments such as state where the user is in a "train" and state where the user is in a "coffee shop" will be described.

In the music reproducing apparatus 101 in the related art, a plurality of music pieces have been classified every category and recorded. For example, a music piece A, a music piece B, . . . have previously been classified into the category of "rock" and recorded and a music piece C, a music piece D, . . . have previously been classified into the category of "classic" and recorded. When the user manually selects a desired category, the music pieces corresponding to the selected category are selected and reproduced.

It is considered that the selection of the category by the user is made in accordance with an ambient environmental noise level or the like. For example, when the user is in a train, since the ambient environmental noise level is high, it is difficult to listen to the music pieces classified into the category of "classic" of slow tune. Therefore, in such a case, it is considered that the music pieces classified into the category of "rock" which can be listened to in the situation of the high environmental noise level are selected. For example, when the user relaxes in a coffee shop, since the ambient environmental noise level is low, it is considered in such a case that the music pieces classified into the category of "classic" are selected.

Subsequently, a selecting method of the category of the music pieces in the music reproducing apparatus 101 in the related art will be described with reference to a flowchart shown in FIG. 23. In step S101, a power source of the music reproducing apparatus 101 is turned on. In step S102, the ambient environment is recognized by the user. In step S103, the category according to the ambient environmental noise level is selected by the user. For example, when the user is in a train, the category of "rock" is selected and, when the user is in a coffee shop, the category of "classic" is selected.

In step S104, predetermined music pieces are selected from the music pieces corresponding to the selected category and reproduced. As music pieces which are reproduced, for example, a plurality of music pieces classified into the selected category may be reproduced at random or can be also reproduced in predetermined reproducing order.

In step S105, whether or not the music is continuously listened to is discriminated. If it is decided that the music is continuously listened to, a processing routine is returned to step S102 and the ambient environment is recognized again by the user. If it is decided that the music is not listened to, the processing routine advances to step S106 and the power source of the music reproducing apparatus 101 is turned off and a series of processes is finished.

In this manner, in the music reproducing apparatus 101 in the related art, the user recognizes the ambient environment by himself and manually selects the category of the music pieces in accordance with the environmental noise level.

SUMMARY OF THE INVENTION

However, in the foregoing music reproducing apparatus in the related art, since the user manually selects the category and reproduces the music pieces, even if the environment was changed, the music pieces classified into the selected category are continuously reproduced so long as the category is not changed.

For example, when the user is in a train, since the environmental noise level is high, the category of "rock" is selected and the user listens to the music pieces in a state where a volume has relatively been increased. After that, when the user gets off the train and enters a coffee shop, if he continues to listen to the music pieces classified into the category of "rock" as it is, since the environmental noise level is lower than that in the train, there is such a problem that the user gives a trouble to the ambient persons due to a sound leakage from the headphones.

For example, there is also the following problem. Since it is difficult to listen to the music pieces classified into the category of "classic" in the train, the category of "rock" is selected and the user listens to the music pieces in a state where the volume was properly set. When the next music piece is reproduced, even in the case of the same category of "rock", since a recording level or a tune changes largely, the ears of the user are damaged or the user gives a trouble to the ambient persons due to the sound leakage from the headphones.

Therefore, in recent years, a music reproducing apparatus in which in addition to that the music pieces are classified into the category, desired music pieces are automatically selected in accordance with a time-dependent environmental change such as morning or night or a mood of the user and reproduced has also been put into practical use. According to such an apparatus, for example, the music pieces recorded in the music reproducing apparatus are classified into the category of each time zone such as morning, noon, or midnight, respectively, and the music pieces corresponding to the present time zone are automatically selected by using a clock built in the music reproducing apparatus and reproduced.

However, a problem similar to that mentioned above also occurs in the case of such a music reproducing apparatus. In the case of recognizing the environment on the basis of the time and selecting the music pieces, for example, even in the morning time zone, since the ambient environmental noise level in the train and that in the coffee shop differ, it is difficult to select the music pieces suitable for the environment.

It is, therefore, desirable to provide a music piece reproducing apparatus, a music piece reproducing method, and a music piece reproducing program in which music pieces which can be easily listened to even under environmental noises can be automatically selected.

According to an embodiment of the present invention, there is provided a music piece reproducing apparatus comprising: a sound collecting unit collecting noise data of an ambient environment; an analyzing unit performing a frequency analysis to the noise data collected by the sound collecting unit and extracting a feature amount showing a feature of the noise data; a noise parameter database classifying the noise data every environment; and a reproducing unit reproducing music piece data which has been recorded in a recording medium and classified every category, wherein the analyzing unit classifies the noise data with reference to the noise parameter database on the basis of the extracted feature amount of the noise data, selects the previously-corresponded category of music pieces in accordance with a classification result of the noise data, and selects predetermined music piece data from music piece data classified into the selected category.

According to another embodiment of the invention, there is provided a music piece reproducing apparatus comprising: a sound collecting unit collecting noise data of an ambient environment; an analyzing unit performing a same frequency analysis to the noise data collected by the sound collecting unit and music piece data recorded in a recording medium and extracting feature amounts showing features of the noise data and the music piece data, respectively; a music piece feature amount database in which the extracted feature amount of the music piece data is recorded in correspondence to the music piece data; and a reproducing unit reproducing the music piece data recorded in the recording medium, wherein the analyzing unit selects predetermined music piece data from the music piece data recorded in the recording medium on the basis of the extracted feature amount of the noise data and the feature amounts of the music piece data recorded in the music piece feature amount database.

According to still another embodiment of the present invention, there is provided a music piece reproducing method comprising: a sound collecting step of collecting noise data of an ambient environment; an analyzing step of performing a frequency analysis to the noise data collected by the sound collecting step and extracting a feature amount showing a feature of the noise data; and a reproducing step of reproducing music piece data which has been recorded in a recording medium and classified every category, wherein in the analyzing step, the noise data is classified on the basis of the extracted feature amount of the noise data with reference to a noise parameter database for classifying the noise data every environment, selects the previously-corresponded category of music pieces in accordance with a classification result of the noise data, and selects predetermined music piece data from music piece data classified into the selected category.

According to the embodiments of the invention, the noise data of the ambient environment is collected, the frequency analysis is performed to the collected noise data, the feature amount showing the feature of the noise data, the noise data is classified on the basis of the extracted feature amount of the noise data with reference to the noise parameter database for classifying the noise data every environment, the previously-corresponded category of the music pieces is selected in accordance with the classification result of the noise data, and the predetermined music piece data is selected from the music piece data classified into the selected category. Therefore, the music piece data according to the ambient environment is reproduced.

According to the embodiments of the invention, the noise data of the ambient environment is collected, the same frequency analysis is performed to the collected noise data and the music piece data recorded in the recording medium, the feature amounts showing the features of the noise data and the music piece data are extracted, respectively, and the predetermined music piece data is selected from the music piece data recorded in the recording medium on the basis of the extracted feature amount of the noise data and the feature amounts of the music piece data recorded in the music piece feature amount database in which the extracted feature amount of the music piece data is recorded in correspondence to the music piece data. Therefore, the music piece data according to the ambient environment is reproduced.

According to the embodiments of the invention, the feature amounts are extracted from the collected noise data of the ambient environment and the predetermined music piece data is selected from the music piece data recorded in the recording medium on the basis of the extracted feature amount of the noise data. Therefore, such an effect that the proper music pieces can be automatically selected in accordance with the environmental noises.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a construction of an example of the music reproducing apparatus which can be applied to the first embodiment of the invention;

DETAILED DESCRIPTION OF THE PREFERRED EMBODIMENTS

An embodiment of the invention will be described hereinbelow with reference to the drawings. In the embodiment of the invention, feature amounts are extracted by analyzing ambient environmental noises and the environmental noises are classified in accordance with the extracted feature amounts. Music pieces suitable for an environmental noise level are automatically selected in accordance with a classification result of the environmental noises.

The first embodiment of the invention will be described. In the first embodiment of the invention, a microphone is connected to a music reproducing apparatus and the ambient environmental noises are collected from the connected microphone. The collected environmental noises are analyzed, the environmental noises are classified on the basis of the feature amounts of the environmental noises obtained by the analysis, and a previously-corresponded category of music pieces is automatically selected every classification of the environmental noises.

Figure 1:
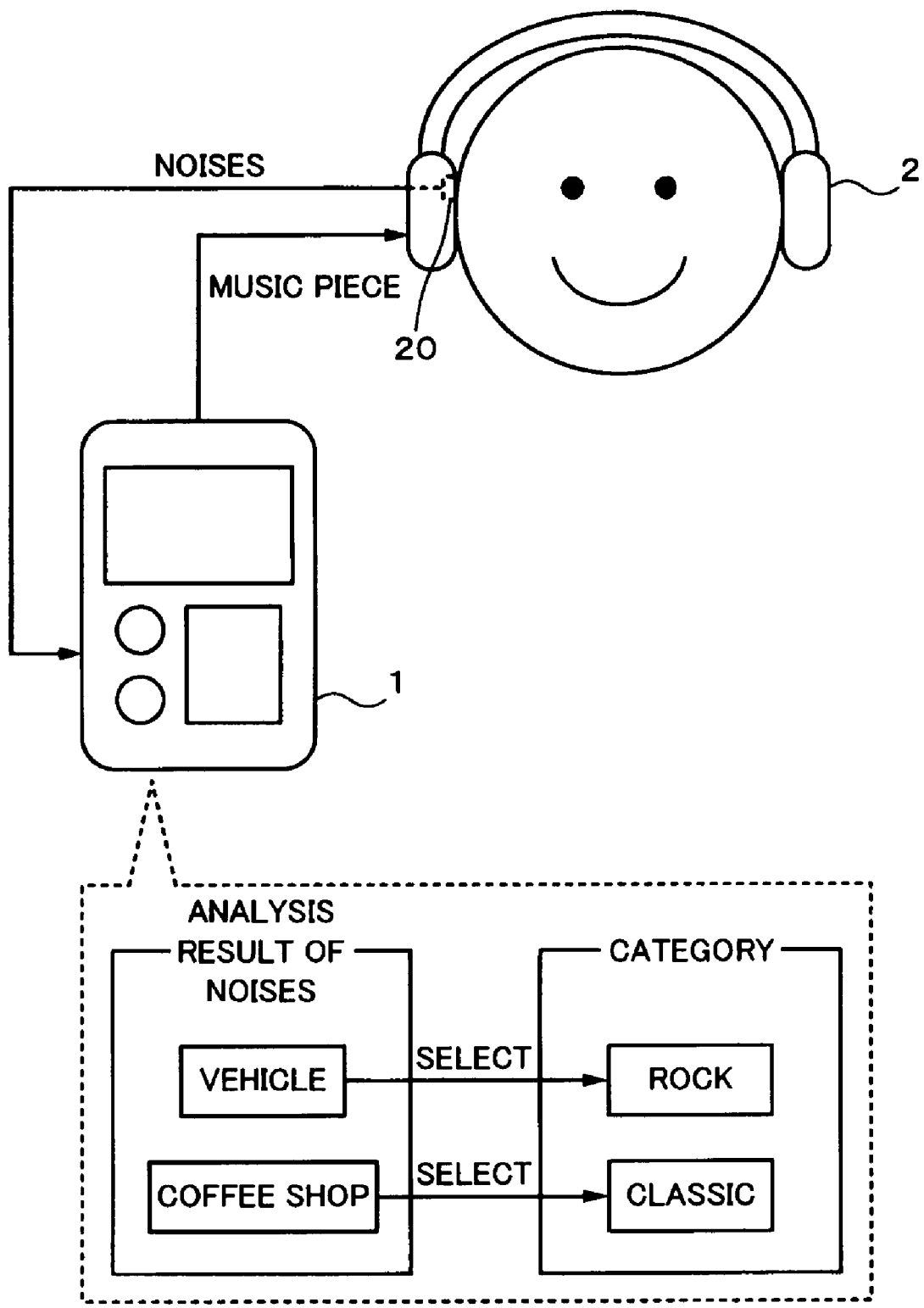
FIG. 1 is a schematic diagram showing a using form of an example of a music reproducing apparatus which can be applied to the first embodiment of the invention.

FIG. 1 shows a using form of an example of a music reproducing apparatus 1 which can be applied to the first embodiment of the invention. In the example shown in FIG. 1, a state where a microphone 20 (hereinbelow, also properly referred to as a mic 20) and headphones 2 are connected to the music reproducing apparatus 1 such as a portable music reproducing apparatus or the like and the user is listening to music pieces recorded in the music reproducing apparatus 1 through the headphones 2 is illustrated. The mic 20 is provided, for example, in the headphones 2 and the environmental noises which are heard at a position of the ear in a state where the user has put the headphones 2 on his head are collected.

A plurality of music pieces have been classified into categories and recorded in the music reproducing apparatus 1. As a category classifying method of the music pieces, for example, a music piece classifying method in the related art can be used. In this example, in order to make an explanation easy, it is assumed that the music pieces recorded in the music reproducing apparatus 1 have been classified into one of the two categories of "rock (that is, rock music)" and "classic (that is, classical music)".

The environmental noises collected by the mic 20 are analyzed by a predetermined process and are classified in accordance with an analysis result. In the example, as an analysis result of the environmental noises, for example, they are classified into one of the two environments of "vehicle" and "coffee shop". In the example, the environmental noises are classified by using a method different from the method of classifying the music pieces.

A correspondence relation between the classification of the environmental noises and the category of the music pieces is preset by the user. For example, the environmental noises classified into "vehicle" and the category of "rock" are made to correspond to each other. The environmental noises classified into "coffee shop" and the category of "classic" are made to correspond to each other.

When the user instructs the music reproducing apparatus 1 to select the music pieces according to the environmental noises, the music reproducing apparatus 1 collects the ambient environmental noises by the mic 20 and analyzes the environmental noises. On the basis of the analysis result of the environmental noises, the music reproducing apparatus 1 selects the corresponded category of the music pieces and reproduces the music pieces classified into the selected category. For example, when the environmental noises are classified into "vehicle", "rock" is selected as a category of the music pieces. When the environmental noises are classified into "coffee shop", "classic" is selected as a category of the music pieces.

A construction of an example of the music reproducing apparatus 1 which can be applied to the first embodiment of the invention will now be described with reference to FIG. 2. In FIG. 2, portions which are not concerned with the first embodiment of the invention are not illustrated and their explanation is omitted. In the music reproducing apparatus 1, a CPU (Central Processing Unit) 11, a ROM (Read Only Memory) 12, a RAM (Random Access Memory) 13, an audio signal processing unit 14, a recording and reproduction control unit 15, an input processing unit 16, and an operation unit 17 are connected through a bus 10.

The CPU 11 uses the RAM 13 as a work memory and controls the whole operation of the music reproducing apparatus 1 in accordance with programs which have previously been stored in the ROM 12. For example, the CPU 11 transmits and receives commands and data to/from each unit through the bus 10 and controls each unit. In accordance with the operation to the operation unit 17, which will be explained hereinafter, the CPU 11 controls the reproduction of music piece data recorded in a recording medium 18.

The CPU 11 receives noise data of the environmental noises collected by the mic 20, which will be explained hereinafter, through the input processing unit 16 and analyzes the noise data. The CPU 11 properly classifies the environmental noises in accordance with an analysis result and controls the reproduction of the corresponded music piece data every classification.

An audio output unit 19 is connected to the audio signal processing unit 14. The audio signal processing unit 14 receives the music piece data as a reproduction target, executes various kinds of processes such as D/A (Digital/Analog) conversion and the like to the music piece data, and converts the music piece data into an analog audio signal. If the music piece data has been compressed, the audio signal processing unit 14 executes a decompressing process to the music piece data by a predetermined compressing system. The audio signal processing unit 14 outputs the converted analog audio signal through the audio output unit 19. For example, the headphones 2 or speakers can be used as an audio output unit 19.

The recording medium 18 is connected to the recording and reproduction control unit 15. The recording and reproduction control unit 15 controls the recording of data into the recording medium 18 and controls the reproduction of the data recorded in the recording medium 18. The music piece data and a noise parameter database which is referred to at the time when the noise data is analyzed by the CPU 11 have been recorded in the recording medium 18. As a recording medium 18, for example, a detachable non-volatile memory, a detachable hard disk, or a hard disk built in the music reproducing apparatus 1 can be used. Details of the noise parameter database will be described hereinafter.

The mic 20 is connected to the input processing unit 16. The mic 20 collects the environmental noises, converts the noise data of the environmental noises into an analog audio signal, and supplies to the input processing unit 16. The input processing unit 16 executes various kinds of processes such as an A/D (Analog/Digital) conversion and the like to the analog audio signal supplied from the mic 20 and converts the analog audio signal into digital noise data. The converted noise data is supplied to the CPU 11.

The operation unit 17 is provided with various kinds of operation knobs which are used to operate the music reproducing apparatus 1 and generates a control signal according to the operation of each operation knob. For example, a reproduction key and a stop key for reproducing/stopping the music piece data, operation knobs for automatically selecting and reproducing the music pieces according to the environmental noises, and the like are provided.

Subsequently, a classifying method of the environmental noises will be described. The noises which are heard from the ambient environments differ depending on the environments such as inside of a train or a bus, coffee shop, and the like. Those environmental noises have features which differ depending on the environments such as case where a sound volume of a low band in an audible frequency band is large, case where a sound volume of a high band is large, and the like.

Figure 3A:
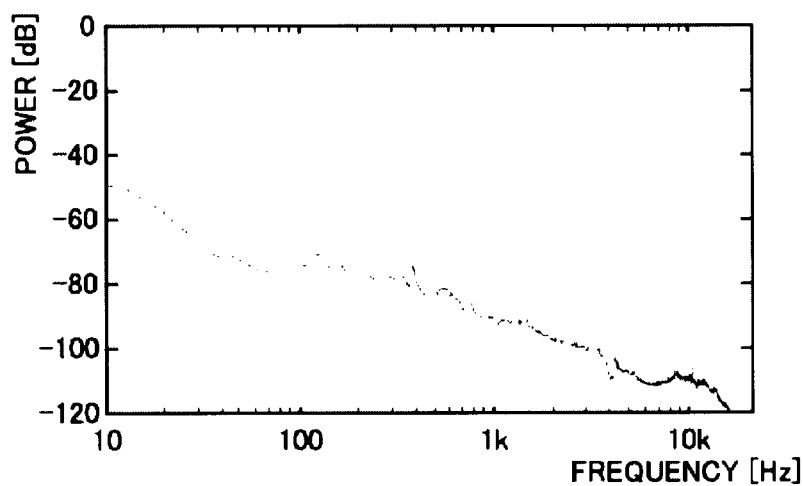
FIGS. 3A to 3C are schematic diagrams showing examples of frequency characteristics of environmental noises.
Figure 3B:
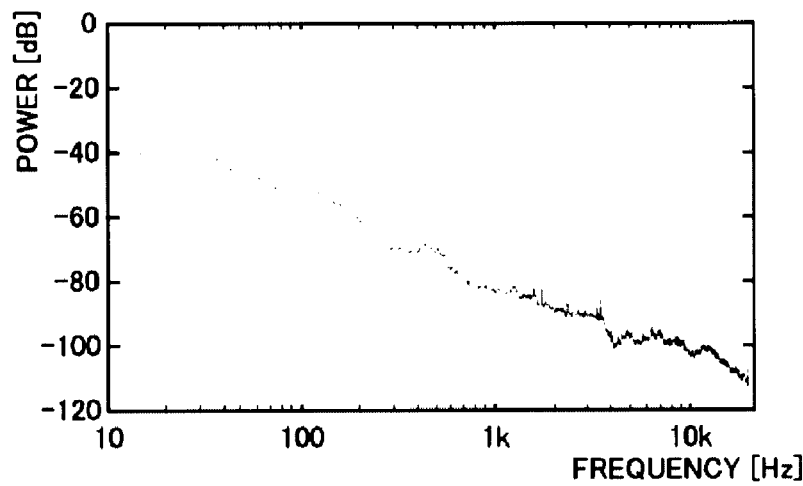
Figure 3C:
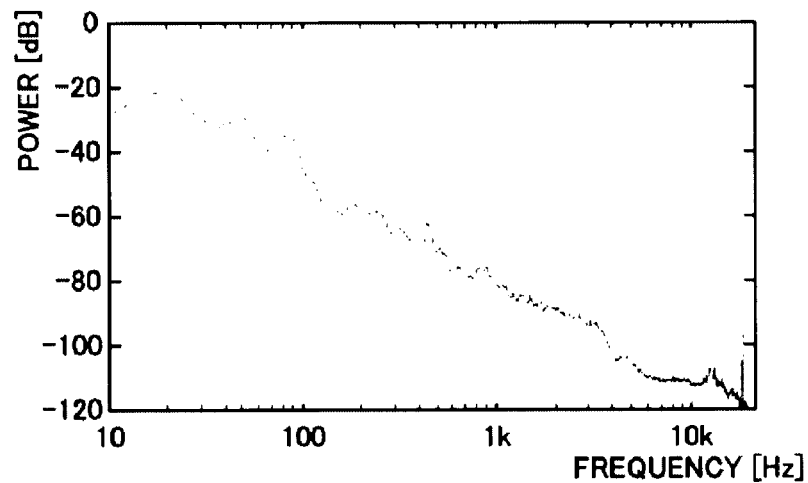

FIGS. 3A, 3B, and 3C show examples of frequency characteristics of the environmental noises collected in the "coffee shop", "train", and "bus", respectively. Those examples relate to the frequency characteristics obtained by making a frequency analysis based on an FFT (Fast Fourier Transform) to time data of about 0.5 second of the collected environmental noises, respectively. In the diagrams, an axis of abscissa indicates a frequency [Hz] and an axis of ordinate indicates a power [dB]. It will be understood from FIGS. 3A to 3C that values of the powers at respective frequencies differ largely in various environments. Therefore, by extracting such features, the environment where the user exists can be discriminated.

In the frequency analysis by the FFT, when the number of samples of the time data which is analyzed is assumed to be x, the frequency data which is obtained as a power is equal to x/2. At this time, in order to raise precision of the analysis of the environmental noises, it is necessary to raise frequency resolution. For this purpose, it is necessary to set the number of samples to a certain large value. For example, assuming that the number of samples of the time data is equal to 32768, the number of frequency data which is obtained is equal to 16384.

It is considered that, for example, the data at each frequency can be used as a feature amount on the basis of the frequency characteristics of the environmental noises obtained as mentioned above. However, if the 16384 frequency data are used as feature amounts of the environmental noises, since a data amount becomes very large, it takes a long time to execute processes. A time-dependent fluctuation of the frequency data also increases. Therefore, such a method is not practical.

Figure 4A:
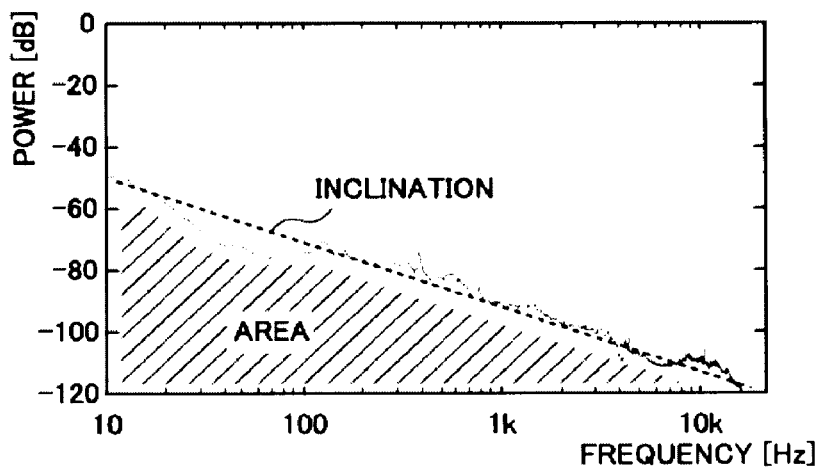
FIGS. 4A to 4C are schematic diagrams for explaining feature amounts of the environmental noises.
Figure 4B:
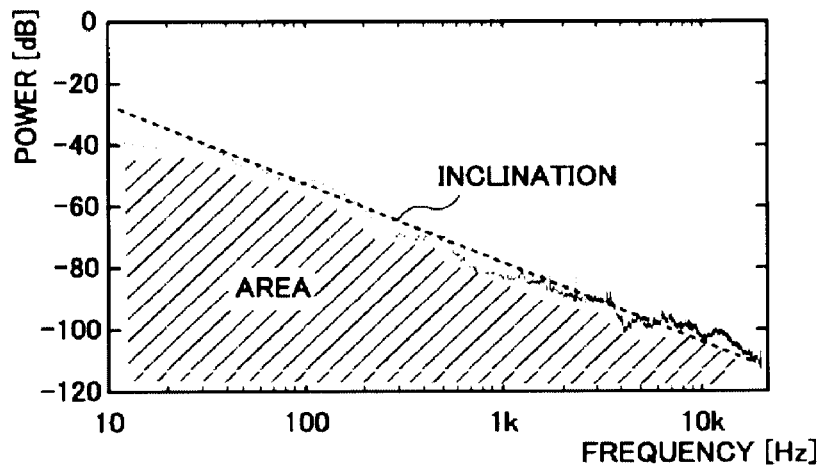
Figure 4C:
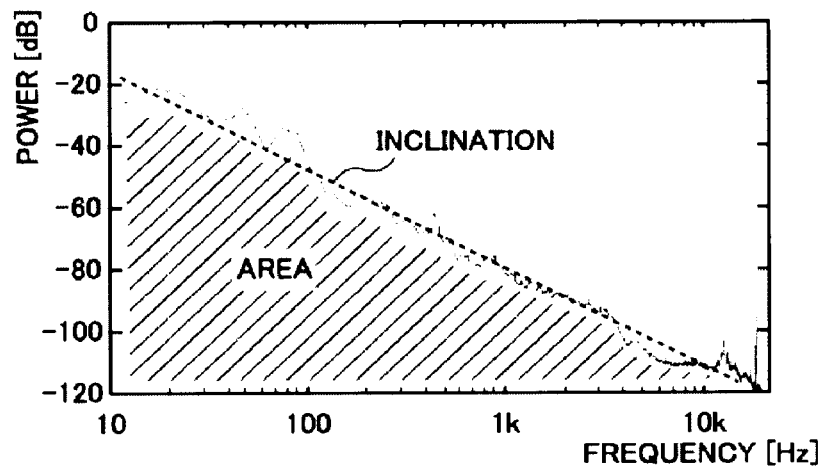

To solve such a problem, for example, as shown in FIGS. 4A, 4B, and 4C, attention is paid to an inclination (portion shown by a broken line in each of FIGS. 4A to 4C) of an envelope of the frequency data in each environment and an area of the portion (hatched portion in each of FIGS. 4A to 4C) surrounded by the envelope. For example, the power of the low band in the train or bus is larger than that in the coffee shop. Therefore, according to the frequency characteristics of the noises in the train or bus, it can be decided that the inclination of the envelope is larger and the area of the portion surrounded by the envelope is larger than those of the frequency characteristics of the noises in the coffee shop.

In the first embodiment of the invention, therefore, the inclination of the envelope in the frequency region of the environmental noises and the sum of the powers shown by the area of the portion surrounded by the envelope are calculated as feature amounts.

Figure 5:
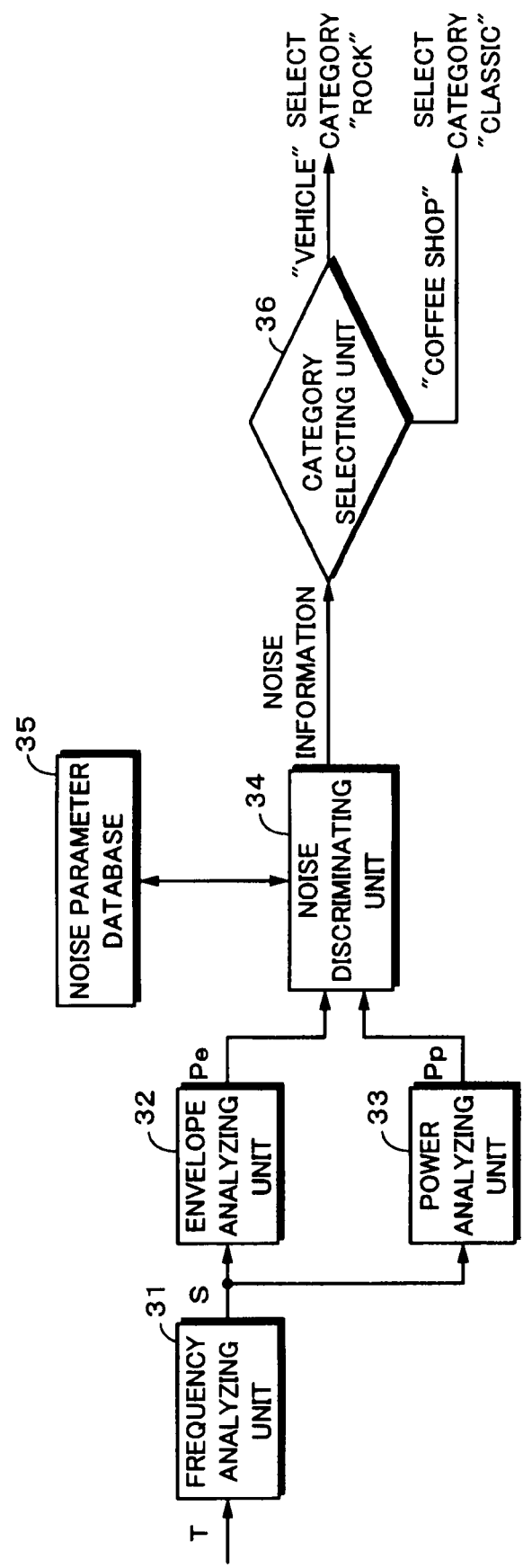
FIG. 5 is a block diagram for explaining an example of a classifying method of the environmental noises.

FIG. 5 is a block diagram for explaining an example of the classifying method of the environmental noises. The classification of the environmental noises shown in FIG. 5 is performed by the CPU 11. In this example, a case where the envelope and power in the frequency region of the environmental noises are analyzed as an analysis to the environmental noises and their analysis results are calculated as feature amounts of the environmental noises will be described.

Noise data T of the environmental noises collected by the mic 20 is supplied to a frequency analyzing unit 31. By using the noise data having a short time length of a predetermined time, for example, about 0.5 second of the inputted noise data T, the frequency analyzing unit 31 performs frequency analyses such as FFT analysis, Octave analysis, and the like to the noise data T, thereby obtaining frequency information S. The obtained frequency information S is supplied to an envelope analyzing unit 32 and a power analyzing unit 33, respectively.

The envelope analyzing unit 32 analyzes the envelope in the frequency region of the noise data T on the basis of the inputted frequency information S and calculates envelope information Pe obtained by, for example, properly converting the envelope in a predetermined frequency region into a numerical value. In the example, the value of the inclination of the envelope in the predetermined frequency region is used as envelope information Pe. The calculated envelope information Pe is supplied to a noise discriminating unit 34.

The power analyzing unit 33 analyzes the power in the frequency region of the noise data T on the basis of the inputted frequency information S and calculates power information Pp obtained by, for example, properly converting the power in the predetermined frequency region into a numerical value. In the example, the value of the area of the portion surrounded by the envelope in the predetermined frequency region, that is, the value of the sum of the powers in the predetermined frequency region is used as power information Pp. The calculated power information Pp is supplied to the noise discriminating unit 34.

The noise discriminating unit 34 classifies the environmental noises with reference to a noise parameter database 35 on the basis of the envelope information Pe supplied from the envelope analyzing unit 32 and the power information Pp supplied from the power analyzing unit 33 and forms noise information showing a classification result. The formed noise information is supplied to a category selecting unit 36.

The noise parameter database 35 is a database which is used when the noise data is classified every environment on the basis of the feature amounts extracted from the noise data in the various environments. In this example, the envelope information Pe and the power information Pp are used as feature amounts of the environmental noises and the environmental noises serving as comparison targets are classified on the basis of the feature amounts. In this example, the environmental noises are classified into either "vehicle" or "coffee shop" on the basis of the noise parameter database 35.

The category selecting unit 36 selects the category of the music pieces corresponding to the classification of the environmental noises on the basis of the noise information supplied from the noise discriminating unit 34. For example, when the environmental noises are classified into "vehicle", the category of "rock" is selected and, when the environmental noises are classified into "coffee shop", the category of "classic" is selected. The music pieces are selected by a predetermined selecting method from the music pieces classified into each category and are reproduced.

Figure 6A:
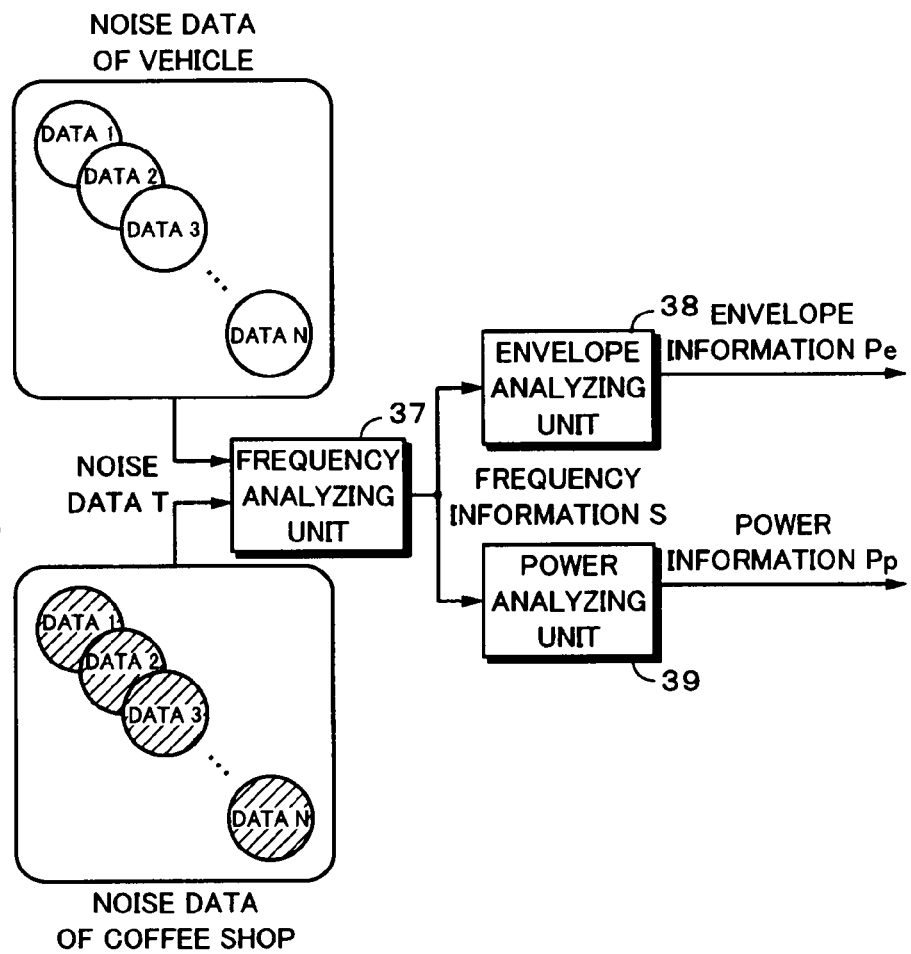
FIGS. 6A and 6B are schematic diagrams for explaining a forming method of a noise parameter database.

The forming method of the noise parameter database 35 will now be described. In the case of forming the noise parameter database, as shown in FIG. 6A, first, the noise data of the environmental noises which were actually collected in the various environments is classified every environment. In this example, for instance, the collected noise data T is classified into the noise data of the respective environments such as "vehicle", "coffee shop", and the like. Those noise data T is supplied to a frequency analyzing unit 37.

The frequency analyzing unit 37 performs a frequency analysis to each of the supplied noise data T, thereby obtaining the frequency information S. The obtained frequency information S is supplied to an envelope analyzing unit 38 and a power analyzing unit 39, respectively. The envelope analyzing unit 38 calculates the envelope information Pe in each noise data T on the basis of the frequency information S. The power analyzing unit 39 calculates the power information Pp in each noise data T on the basis of the frequency information S.

Figure 6B:
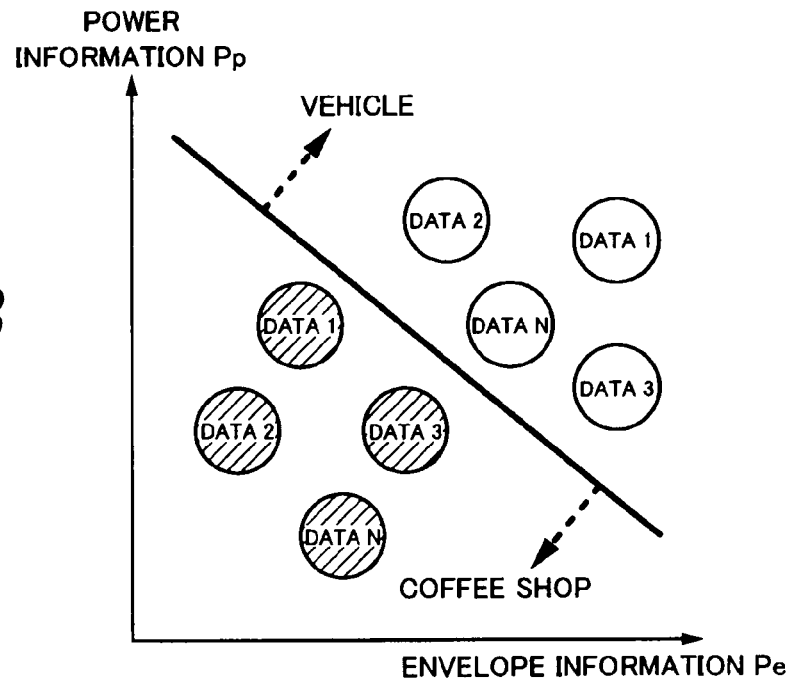

Subsequently, as shown in FIG. 6B, on the basis of the calculated envelope information Pe and the power information Pp, each noise data T is mapped onto a two-dimensional plane of the envelope information Pe and the power information Pp. By mapping the noise data T classified every environment such as "vehicle", "coffee shop", or the like, a boundary is formed onto the 2-dimensional plane every classification of the noise data T. Therefore, a boundary line showing the boundary of each classification is set.

Information of the boundary lines set in this manner and the data of the 2-dimensional plane based on the feature amounts are set as a noise parameter database 35. Therefore, the collected environmental noises can be classified by referring to the noise parameter database 35 on the basis of the feature amounts of the noise data T collected when reproducing the music pieces. For example, by referring to the noise parameter database 35 on the basis of the envelope information Pe and the power information Pp of the collected noise data T, if it is recognized that the collected noise data T exists over the boundary line, the environmental noises are classified into "vehicle". If the collected noise data T exists under the boundary line, the environmental noises are classified into "coffee shop".

If the boundary of each classification is clear, the boundary line may be set by a human judgment. However, if the boundary of each classification is not clear or if the feature amounts are constructed by elements of three or more dimensions, since it is difficult to set the boundary by the human judgment, it is preferable to set the boundary line of each classification by using, for example, a mathematical method.

According to the classification of the environmental noises, the state of the environmental noises is roughly classified into "vehicle", "coffee shop", or the like and the specific state of the environmental noises is not classified. In other words, for example, there is a case where even when the user is in an airplane, the state of the environmental noises is classified into "vehicle", and even when the user is in a library, it is classified into "coffee shop". It is, therefore, assumed that such a classification has ambiguity to a certain extent.

Figure 7:
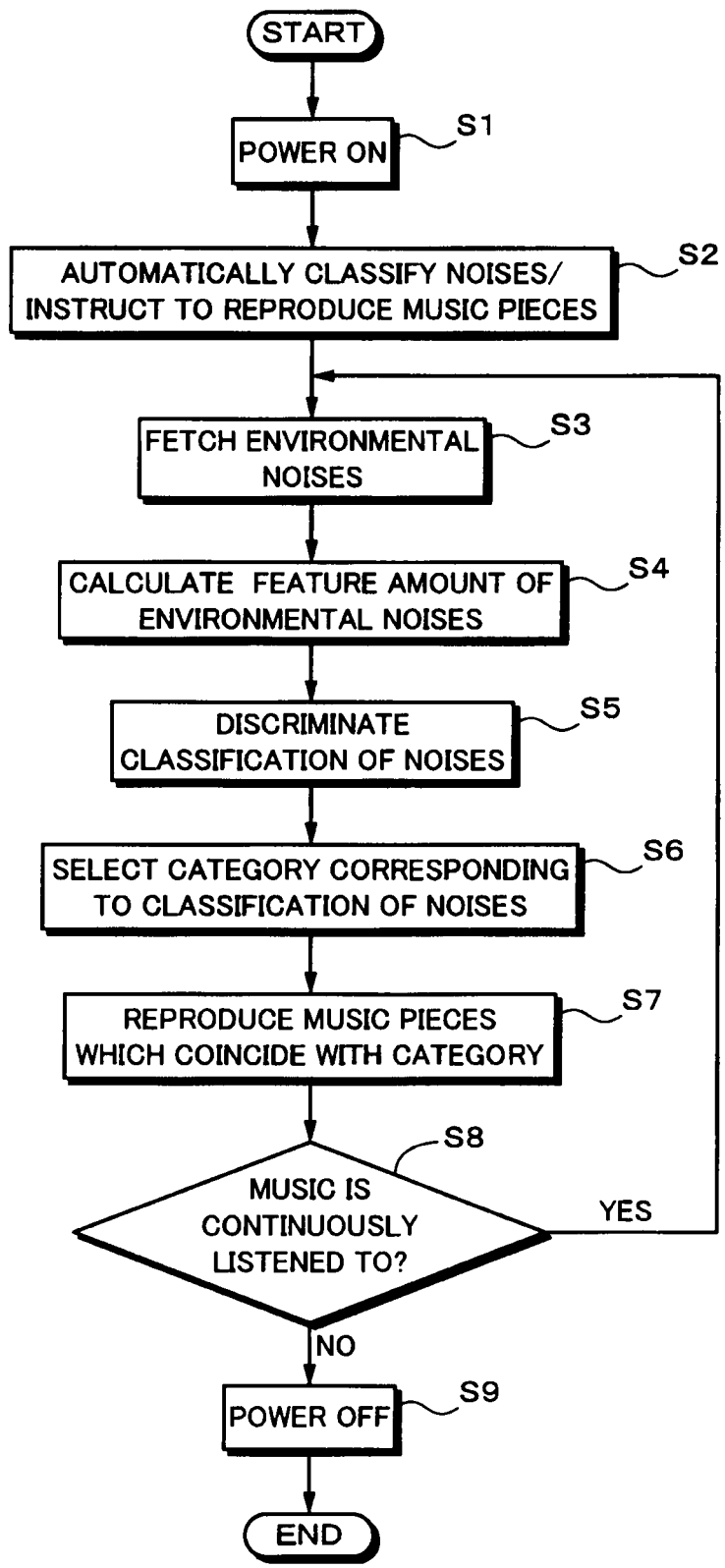
FIG. 7 is a flowchart for explaining a selecting method of a category of music pieces in the first embodiment of the invention.

The selecting method of the category of the music pieces in the first embodiment of the invention will now be described with reference to a flowchart shown in FIG. 7. It is assumed that the following processes are executed under control of the CPU 11 unless otherwise specified. A power source of the music reproducing apparatus 1 is turned on in step S1. When an operation knob which is provided for the operation unit 17 and is used to instruct the reproduction of the music pieces according to the ambient environmental noises is operated by the user in step S2, the environmental noises are collected through the mic 20 and the noise data T of the environmental noises is supplied to the CPU 11 in step S3.

In step S4, the frequency analysis is performed to the noise data T of the collected environmental noises and the envelope information Pe and the power information Pp as feature amounts of the environmental noises are calculated. In step S5, the environmental noises are classified with reference to the noise parameter database on the basis of the calculated envelope information Pe and power information Pp. In this example, the collected environmental noises are classified into either "vehicle" or "coffee shop".

In step S6, the corresponded category of the music pieces is selected on the basis of the classification result of the environmental noises. For example, when the environmental noises are classified into "vehicle", the category of "rock" is selected and, when the environmental noises are classified into "coffee shop", the category of "classic" is selected. In step S7, predetermined music pieces are selected from the music pieces corresponding to the selected category and the corresponding music piece data is read out of the recording medium 18 and reproduced.

In step S8, when the reproduced music pieces are finished, whether or not the user continues to listen to the music is discriminated. If it is determined that the user continues to listen to the music, the processing routine is returned to step S3 and the environmental noises are collected again through the mic 20. In the case of continuously listening to the music pieces, for example, control is made so that the same music piece excluding the reproduced music pieces among the music pieces corresponding to the selected category is not continuously reproduced and the music pieces may be reproduced at random. For example, it is also possible to preset order of reproducing the music pieces every category and reproduce the music pieces in this order.

If it is determined in step S8 that the user does not continue to listen to the music, the processing routine advances to step S9 and the power source of the music reproducing apparatus 1 is turned off by the user and the series of processes is finished.

In this manner, in the first embodiment of the invention, the environmental noises are collected through the mic 20 connected to the music reproducing apparatus 1 and the present environment is discriminated on the basis of the feature amounts extracted from the collected environmental noises. The category of the music pieces which have previously been made to correspond is selected on the basis of the discrimination result. Therefore, the proper music pieces according to the environment can be automatically selected.

Subsequently, a modification of the first embodiment of the invention will be described. According to the classifying method of the environmental noises which can be applied to the first embodiment mentioned above, when the envelope information Pe and the power information Pp as feature amounts of the environmental noises are calculated, the environmental noises are classified by using the noise data having a short time length of, for example, about 0.5 second. Therefore, the classification of the environmental noises is dominated by the short time at which the noise data was obtained.

That is, for example, even if the user is in the coffee shop, there is a large difference between the feature amounts of the environmental noises in the case where the ambient persons are talking and those in the case where the ambient persons are not make a conversation. There is, consequently, a risk that the classification of the environmental noises is not properly performed.

To avoid such a problem, therefore, in the modification of the first embodiment of the invention, the environmental noises are collected every predetermined time and classified, and classification results of the number as many as the predetermined number of times are stored into a memory. On the basis of the classification results of the predetermined number of times, the present environment noises are classified by using a weight coefficient in which the older the data becomes past, the more a weight decreases.

Figure 8:
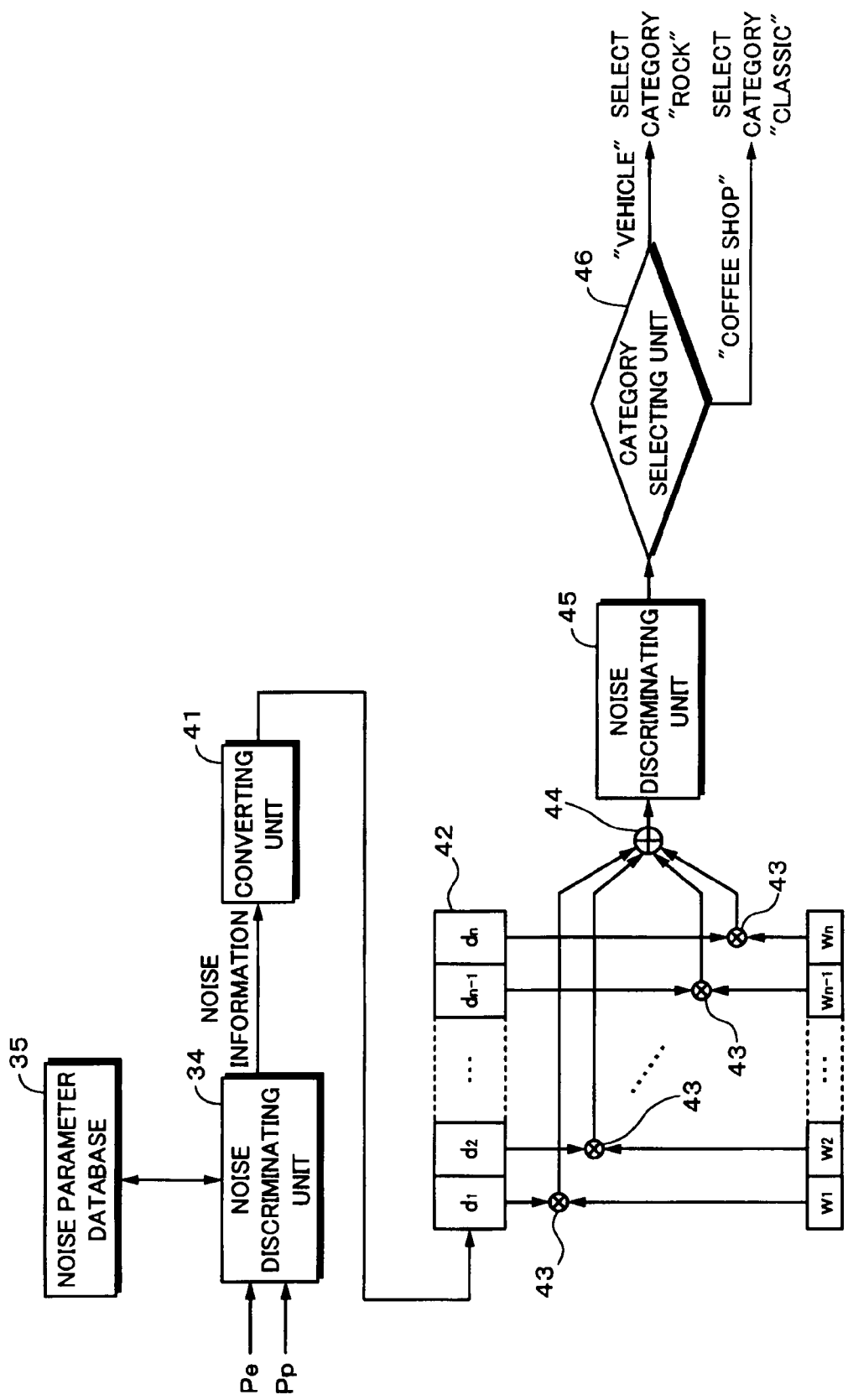
FIG. 8 is a block diagram for explaining an example of a classifying method of the environmental noises which can be applied to a modification of the first embodiment of the invention.

FIG. 8 is a block diagram for explaining an example of the classifying method of the environmental noises which can be applied to the modification of the first embodiment of the invention. The classification of the environmental noises shown in FIG. 8 is performed by the CPU 11. In this instance, a case where the envelope and power in a frequency region of the environmental noises are analyzed as an analysis to the environmental noises and those analysis results are calculated as feature amounts of the environmental noises in a manner similar to the first embodiment mentioned above will be described. Portions similar to those in the foregoing first embodiment are designated by the same reference numerals and their explanation is omitted here.

The envelope information Pe and the power information Pp which are obtained by performing the frequency analysis to the noise data T of the environmental noises collected by the mic 20 are supplied to the first noise discriminating unit 34. The environmental noises are classified by referring to the noise parameter database 35 on the basis of the supplied envelope information Pe and power information Pp, thereby forming the noise information showing the classification result. The formed noise information is supplied to a converting unit 41.

The converting unit 41 converts the classification result into a predetermined numerical value on the basis of the supplied noise information. For example, when the environmental noises are classified into "vehicle", the classification result is converted into "0", and when they are classified into "coffee shop", the classification result is converted into "1". Data converted into the numerical value in accordance with the classification result is supplied to a memory 42.

The memory 42 has an area in which the data of a predetermined number of times, for example, n times can be stored. When new data is supplied to the memory 42, the stored data is shifted one by one, the data which is oldest in terms of the time is deleted, and the supplied new data is stored in the memory 42.

Specifically speaking, for example, when the new data is supplied to the memory 42, oldest data $d_n$ among the data stored in the memory 42 is deleted and data $d_{n-1}$ is shifted by one and stored as data $d_n$ into the memory 42. Similarly, each of data $d_3$, $d_2$, and $d_1$ is shifted by one and resultant data is stored as data $d_4$, $d_3$, and $d_2$ into the memory 42, respectively. The data which has newly been supplied is stored as data $d_1$ into the memory 42.

The data $d_1$, $d_2$, ..., and $d_n$ stored in the memory 42 are supplied to multipliers 43, 43, ..., respectively.

The multipliers 43, 43, ... convolution operate weight coefficients $w_1$, $w_2$, ..., and $w_n$ to the data $d_1$, $d_2$, ..., and $d_n$ supplied from the memory 42, respectively. The weight coefficients $w_1$, $w_2$, ..., and $w_n$ are coefficients adapted to decide the weights of the data stored in the memory 42 and are set in such a manner that the older the data becomes past, the more the weight decreases as shown by the following numerical expression (1).

$$1 \geq w_1 > w_2 > \ldots w_{n-1} > w_n \geq 0 \quad (1)$$

The data as results obtained by convolution operating the weight coefficients $w_1$, $w_2$, ..., and $w_n$ to the data $d_1$, $d_2$, ..., and $d_n$ is supplied to an adder 44. The adder 44 respectively adds the data as results of the convolution operation supplied from the multipliers 43, 43, ... and supplies an addition result to a second noise discriminating unit 45.

The second noise discriminating unit 45 calculates a mean value of the data supplied from the adder 44 and discriminates the environmental noises on the basis of a calculation result. In the example, when the environmental noises are classified into "vehicle", the classification result is set to "0", and when they are classified into "coffee shop", the classification result is set to "1". Therefore, "0.5" is used as a reference and if the mean value exceeds "0.5", it is determined that the category of the environmental noises is "vehicle". If the mean value is equal to or less than "0.5", it is determined that the category of the environmental noises is "coffee shop". The second noise discriminating unit 45 forms information showing a discrimination result and supplies to a category selecting unit 46.

The category selecting unit 46 selects the category of the music pieces corresponding to the classification of the environmental noises on the basis of information showing a discrimination result. For example, when the environmental noises are classified into "vehicle", the category of "rock" is selected, and when the environmental noises are classified into "coffee shop", the category of "classic" is selected. The music pieces are selected by the predetermined selecting method from the music pieces classified into each category and reproduced.

As mentioned above, according to the modification of the first embodiment of the invention, the environmental noises are collected every predetermined time and the category of the music pieces is selected on the basis of the classification of the environmental noises of the predetermined number of times. The arithmetic operation is executed in such a manner that the older the environmental noises become past, the more the weight decreases. Therefore, precision of the classification of the environmental noises can be raised as compared with that in the classifying method of the environmental noises according to the foregoing first embodiment.

Although the case where the mic 20 is provided in the headphones 2 has been described in the first embodiment and the modification of the first embodiment, the invention is not limited to such an example. For instance, the mic 20 may be provided out of the headphones 2 or can be also provided for a casing or the like of the music reproducing apparatus 1. However, frequency characteristics and the like of the environmental noises which are collected from the mic 20 change depending on the position where the mic 20 is provided. It is, therefore, necessary to form a noise parameter database in consideration of the position where the mic 20 is provided and to classify the environmental noises.

Subsequently, the second embodiment of the invention will be described. In the second embodiment of the invention, feature amounts of the environmental noises collected through the mic connected to the music reproducing apparatus are compared with feature amounts of the music pieces recorded in the music reproducing apparatus and the music pieces in each of which the feature amounts are most similar are automatically selected.

In the foregoing first embodiment, the category of the music pieces is previously made to correspond to the classification of the environmental noises and the corresponding category of the music pieces is selected in accordance with a classification result of the environmental noises. When the category of the music pieces is selected as mentioned above, since an algorithm for analyzing the environmental noises and an algorithm which is used to classify the category of the music pieces differ, even in the case of the music pieces classified into the same category, the music pieces suitable for the environmental noises are not always selected. In the case of confirming an affinity between the environmental noises and the category of the music pieces, there is a risk that it takes a time for the confirming process.

Figure 9:
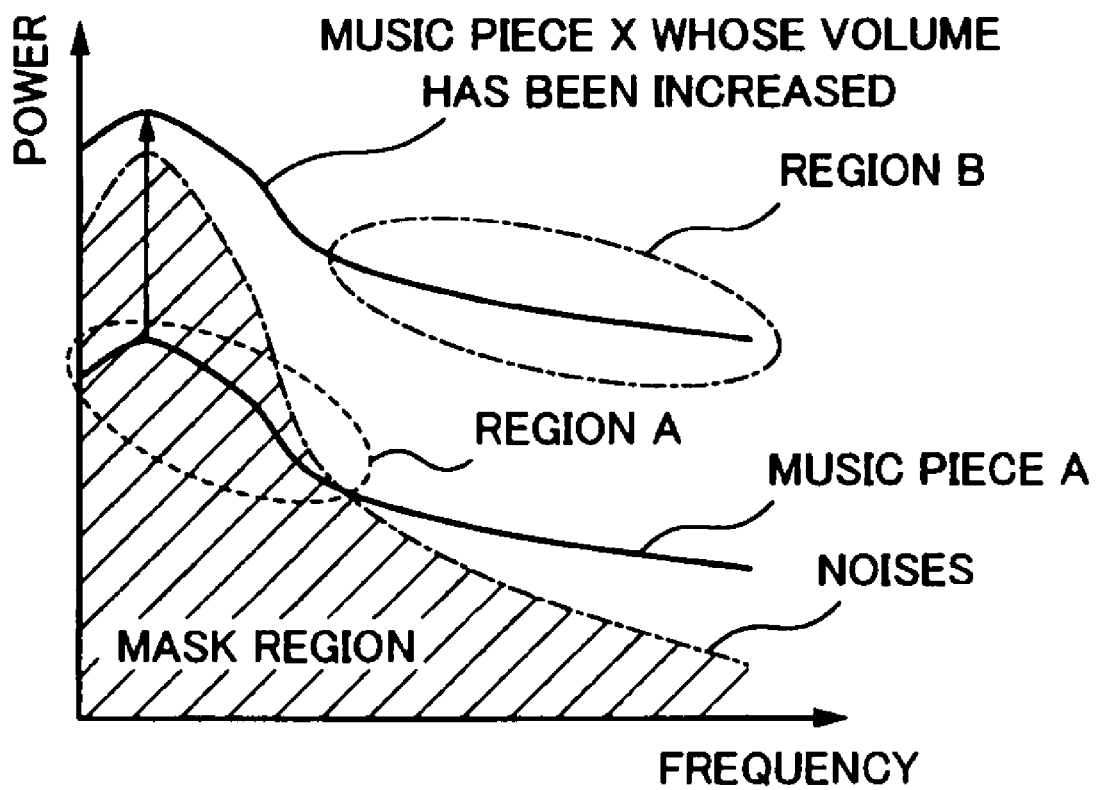
FIG. 9 is a schematic diagram showing the frequency characteristics of the environmental noises and a music piece.

A case of listening to a music piece X under predetermined environmental noises will now be considered. FIG. 9 shows frequency characteristics of the environmental noises and the music piece X. A hatched portion surrounded by an envelope of the environmental noises indicates a region which is masked by the environmental noises. The sound based on frequency components of the music piece data existing in the region which is masked is drowned out by the sound based on frequency components of the environmental noises and it is difficult to be listen to such a sound.

In the case where the music piece X has been listened to under such environmental noises, a shape of the envelope of the environmental noises and a shape of the envelope of the music piece X differ and the frequency components of the music piece X shown by a region A surrounded by a broken line exist in the masked region of the environmental noises. Therefore, the frequency components shown by the region A among the frequency components of the music piece X are masked by the frequency components of the environmental noises. The masked frequency components of the music piece X are a portion having the largest power among the frequency components of the music piece X and are considered to be the principal frequency components of the music piece X. Therefore, the principal portion of the music piece is masked by the environmental noises and it is difficult to properly listen to the music piece.

Therefore, in the case of properly listening to the music piece X, it is necessary to fairly raise a sound volume. However, if the volume was fairly raised, a power of all frequency components increases. Consequently, the sound of the frequency components which ought to have inherently been heard, that is, the sound of the frequency components of the music piece X shown by a region B surrounded by an alternate long and short dash line is excessively heard.

Figure 10:
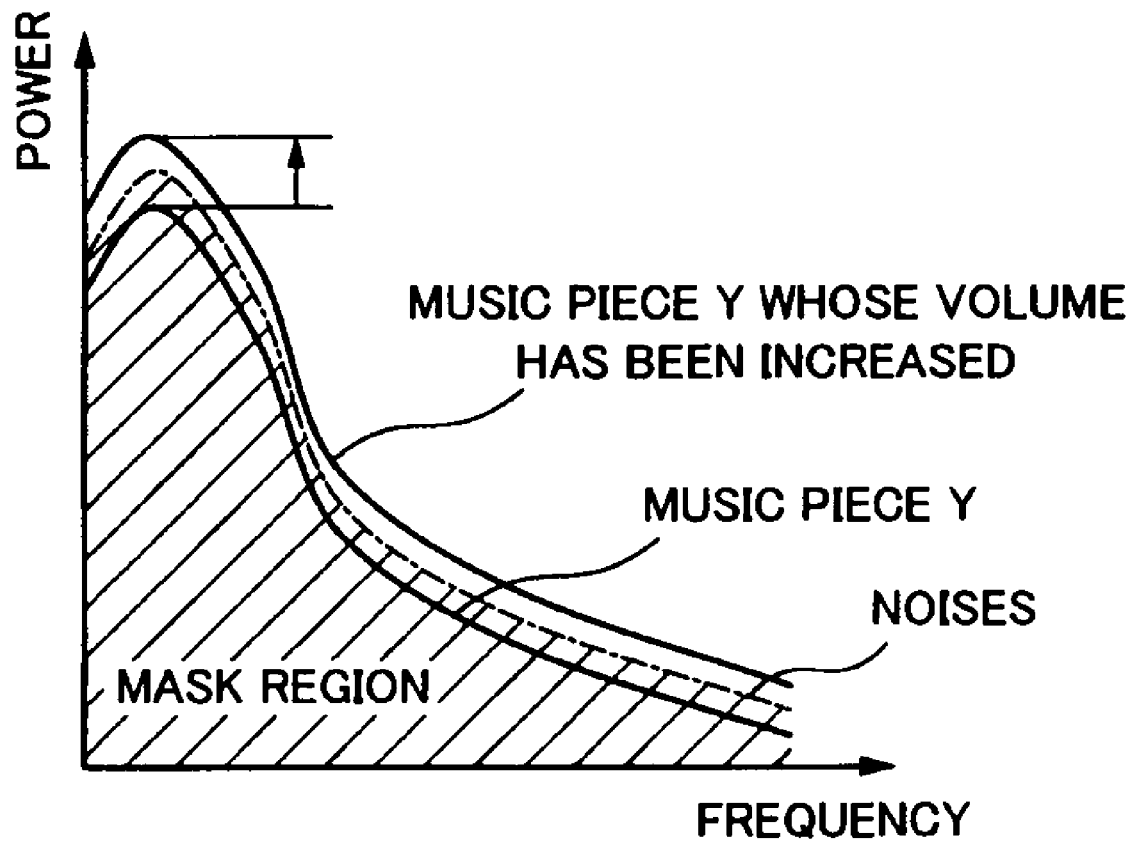
FIG. 10 is a schematic diagram showing frequency characteristics of the environmental noises and another music piece.

FIG. 10 shows frequency characteristics of the environmental noises and another music piece Y. In an example shown in FIG. 10, most of frequency components of the music piece Y exist in a masked region of the environmental noises shown as a hatched region. Therefore, in this state, most of the frequency components of the music piece Y are masked and it is difficult to listen to the music piece Y.

However, since a shape of an envelope of the music piece Y is similar to a shape of the envelope of the environmental noises, by raising the volume, most of the frequency components of the music piece are deviated from the masked region of the environmental noises. Therefore, the music piece Y can be properly listened to without being drowned out by the environmental noises. An increase amount of the volume can be reduced as compared with that in the case of the music piece X shown in FIG. 9 mentioned above.

In the second embodiment of the invention, therefore, the feature amounts of the environmental noises and the music pieces are extracted and the music pieces in each of which the shape of the envelope of the environmental noises and the shape of the envelope of the music piece are similar are selected.

Figure 11:
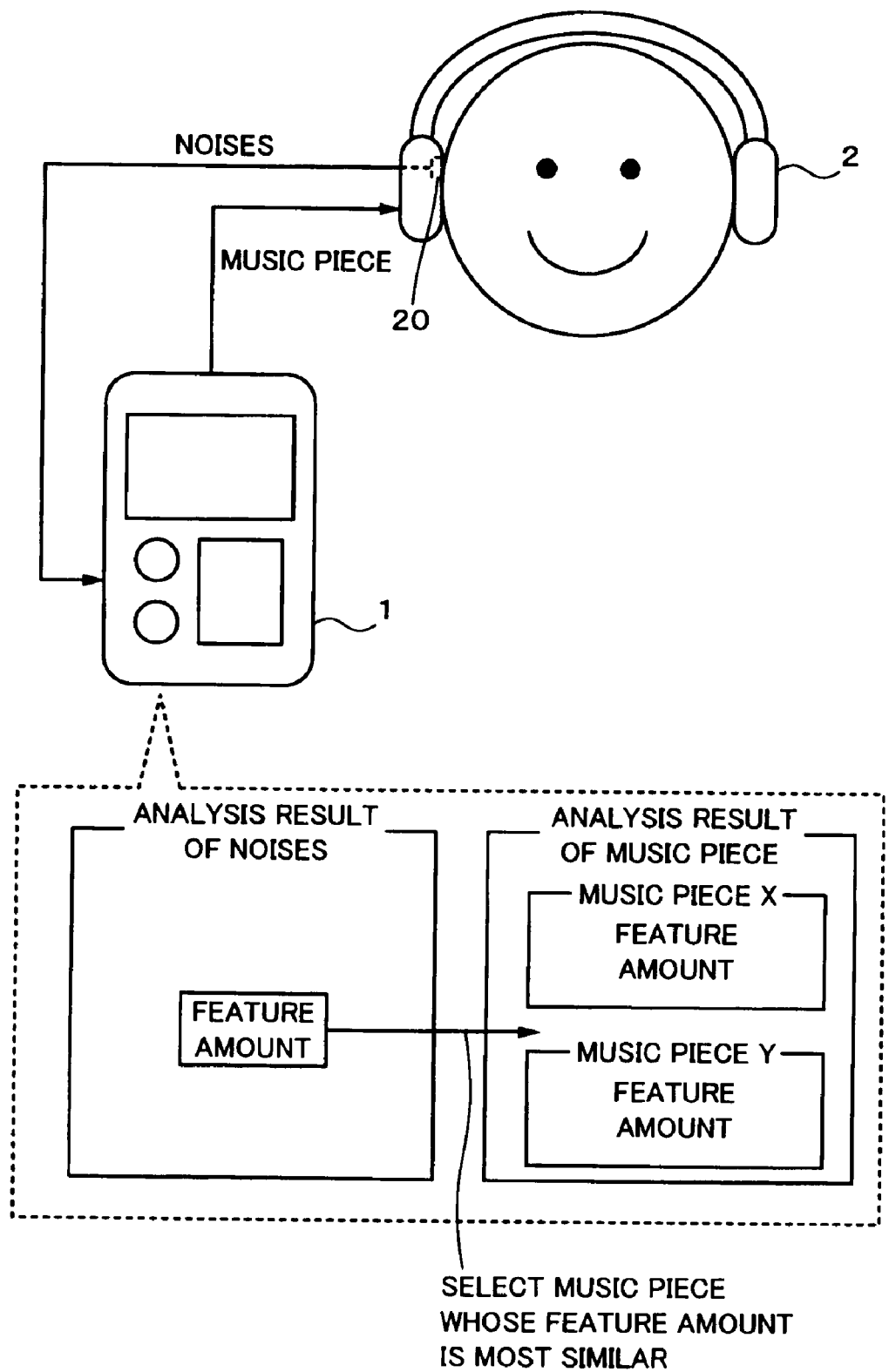
FIG. 11 is a schematic diagram showing a using form of an example of the music reproducing apparatus which can be applied to the second embodiment of the invention.

FIG. 11 shows a using form of an example of the music reproducing apparatus 1 which can be applied to the second embodiment of the invention. In the example shown in FIG. 11, in a manner similar to the first embodiment, the environmental noises are collected through the mic 20 which has been provided in the headphones 2 and connected to the music reproducing apparatus 1. The music reproducing apparatus 1 properly analyzes the environmental noises collected by the mic 20 and extracts the feature amounts. The music reproducing apparatus 1 also properly analyzes the music pieces recorded in the music reproducing apparatus 1 by using the same method as the extracting method of the feature amounts of the environmental noises and extracts the feature amounts. The feature amounts of the environmental noises are compared with the feature amounts of the music pieces. The music pieces in each of which the feature amounts are most similar are selected.

Figure 12:
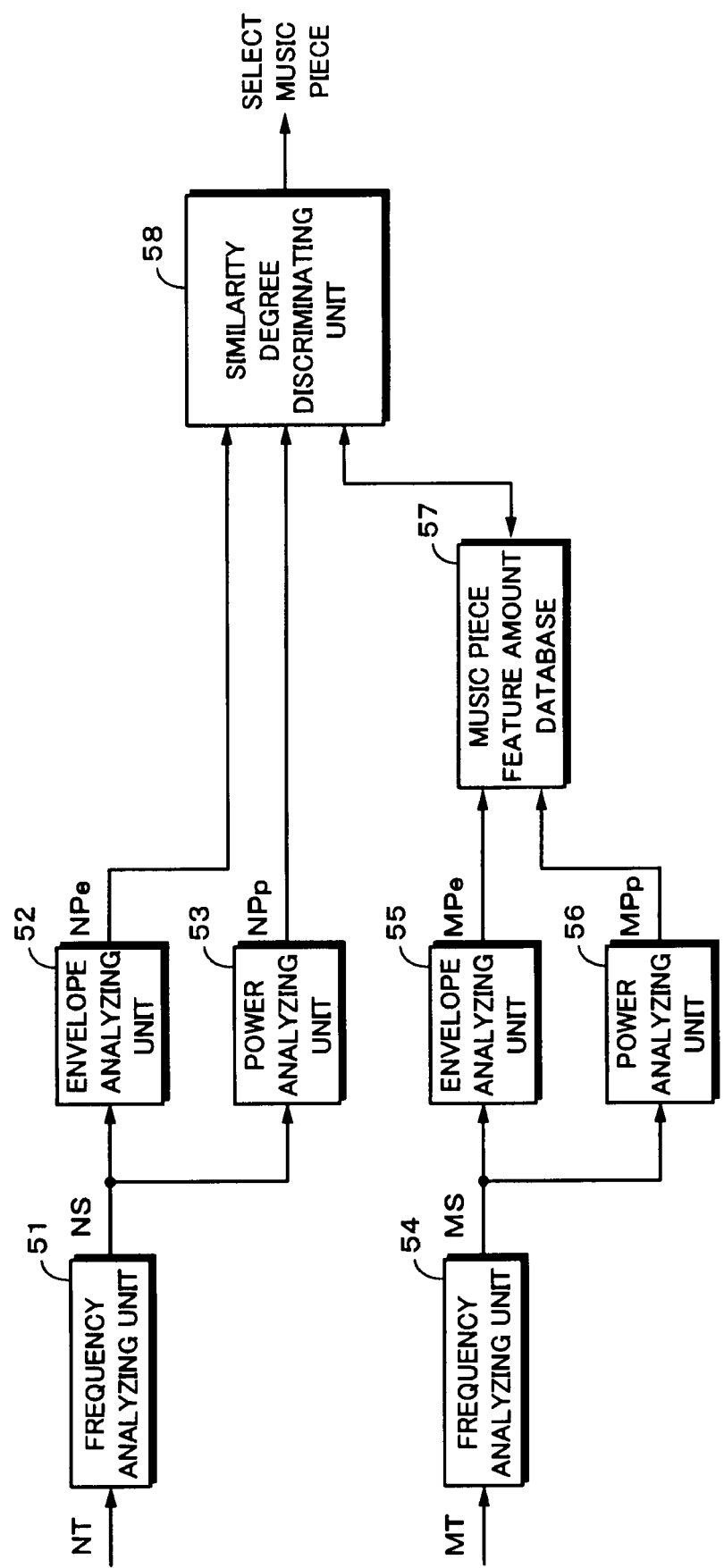
FIG. 12 is a block diagram for explaining an example of a selecting method of music pieces according to environmental noises.

FIG. 12 is a block diagram for explaining an example of a selecting method of the music pieces according to the environmental noises. The selection of the music pieces shown in FIG. 12 is performed by the CPU 11. In this example, as an analysis to the environmental noises and the music pieces, the envelope and power in the frequency region are analyzed. A case where information obtained by converting the envelope and power of each of the environmental noises and the music pieces into numerical values is respectively calculated as feature amounts will be described.

Noise data NT of the environmental noises collected by the mic 20 is supplied to a frequency analyzing unit 51. The frequency analyzing unit 51 executes a frequency analysis such as FFT analysis or Octave analysis to the noise data NT by using noise data having a short time length of a predetermined time, for example, about 0.5 second of the inputted noise data NT, thereby obtaining frequency information NS. The obtained frequency information NS is supplied to an envelope analyzing unit 52 and a power analyzing unit 53.

The envelope analyzing unit 52 analyzes the envelope in the frequency region of the noise data NT on the basis of the inputted frequency information NS and calculates envelope information NPe obtained by, for example, converting an inclination of the envelope in a predetermined frequency band into a numerical value. The calculated envelope information NPe is supplied to a similarity degree discriminating unit 58.

The power analyzing unit 53 analyzes the power in the frequency region of the noise data NT on the basis of the inputted frequency information NS and calculates power information NPp obtained by, for example, converting the sum of powers in the predetermined frequency band into a numerical value. The calculated power information NPp is supplied to the similarity degree discriminating unit 58.

Music piece data MT of the music pieces recorded in the music reproducing apparatus 1 is supplied to a frequency analyzing unit 54. The frequency analyzing unit 54 executes a frequency analysis such as FFT analysis or Octave analysis to the music piece data MT by using the music piece data having a short time length of a predetermined time, for example, about 0.5 second of the inputted music piece data MT, thereby obtaining frequency information MS. The obtained frequency information MS is supplied to an envelope analyzing unit 55 and a power analyzing unit 56.

The envelope analyzing unit 55 analyzes the envelope in the frequency region of the music piece data MT on the basis of the inputted frequency information MS and calculates envelope information MPe obtained by, for example, converting an inclination of the envelope in a predetermined frequency band into a numerical value. The calculated envelope information MPe is supplied to a music piece feature amount database 57.

The power analyzing unit 56 analyzes the power in the frequency region of the music piece data MT on the basis of the inputted frequency information MS and calculates power information MPp obtained by, for example, converting the sum of powers in the predetermined frequency region into a numerical value. The calculated power information MPp is supplied to the music piece feature amount database 57.

The feature amounts of all music piece data recorded in the music reproducing apparatus 1 have been recorded in the music piece feature amount database 57 in correspondence to the respective music pieces. In this example, the envelope information MPe and power information MPp of the music piece data MT have been recorded as feature amounts. When music piece data is newly recorded in the music reproducing apparatus 1, the envelope information MPe and power information MPp calculated in the envelope analyzing unit 55 and power analyzing unit 56 are supplied to the music piece feature amount database 57 and recorded in correspondence to the respective music pieces.

The similarity degree discriminating unit 58 selects music piece having the largest similarity degree for the environmental noises by using the envelope information NPe and power information NPp of the noise data NT and the envelope information MPe and power information MPp of all of the music piece data MT recorded in the music piece feature amount database 57.

Figure 13:
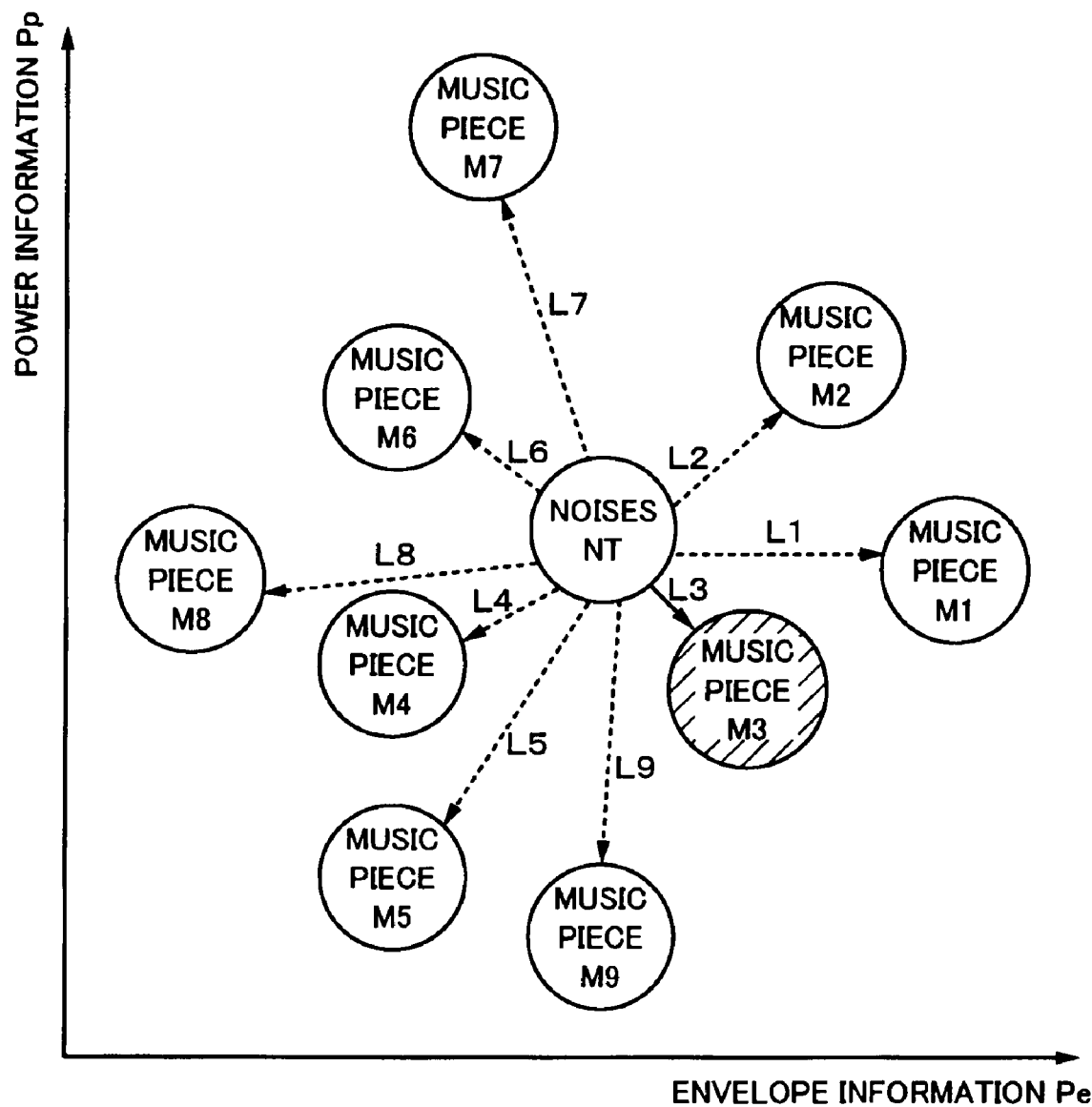
FIG. 13 is a schematic diagram for explaining a similarity degree of noise data and music piece data.

A discriminating method of the similarity degrees of the environmental noises and the music pieces in the similarity degree discriminating unit 58 will be described. For example, a case where the noise data NT and the music piece data MT have been mapped onto a 2-dimensional plane of the envelope information Pe and power information Pp as feature amounts as shown in FIG. 13 will now be considered. FIG. 13 shows an example in which the noise data NT of the environmental noises collected by the mic 20 and music piece data M1 to M9 of the music pieces recorded in the music reproducing apparatus 1 have been mapped. The similarity degrees between the environmental noises and the music pieces are discriminated on the basis of positional relations between the noise data NT of the environmental noises and the music piece data M1 to M9 of the music pieces.

In such a case, it is considered that the case where the environmental noises and the music piece are most similar is a case where a difference between the feature amounts is minimum. That is, the music piece of the music piece data in which a distance L from the environmental noises is shortest is a music piece which is most similar to the environmental noises. The distance between the environmental noises and the music piece is calculated by adding a square of a difference between the envelope information of the noise data NT and the envelope information of the music piece data M1 to M9 and a square of a difference between the power information of them by the following equation (2).

$$L=(NPe-MPe)^2+(NPp-MPp)^2 \qquad (2)$$

In this example, as a result obtained by calculating distances L1 to L9 between the noise data NT and the music piece data M1 to M9 on the basis of the equation (2), it is determined that the distance L3 between the noise data NT and the music piece data M3 is shortest. Therefore, the music piece of the music piece data M3 is selected as a music piece which is most similar to the environmental noises.

Figure 14:
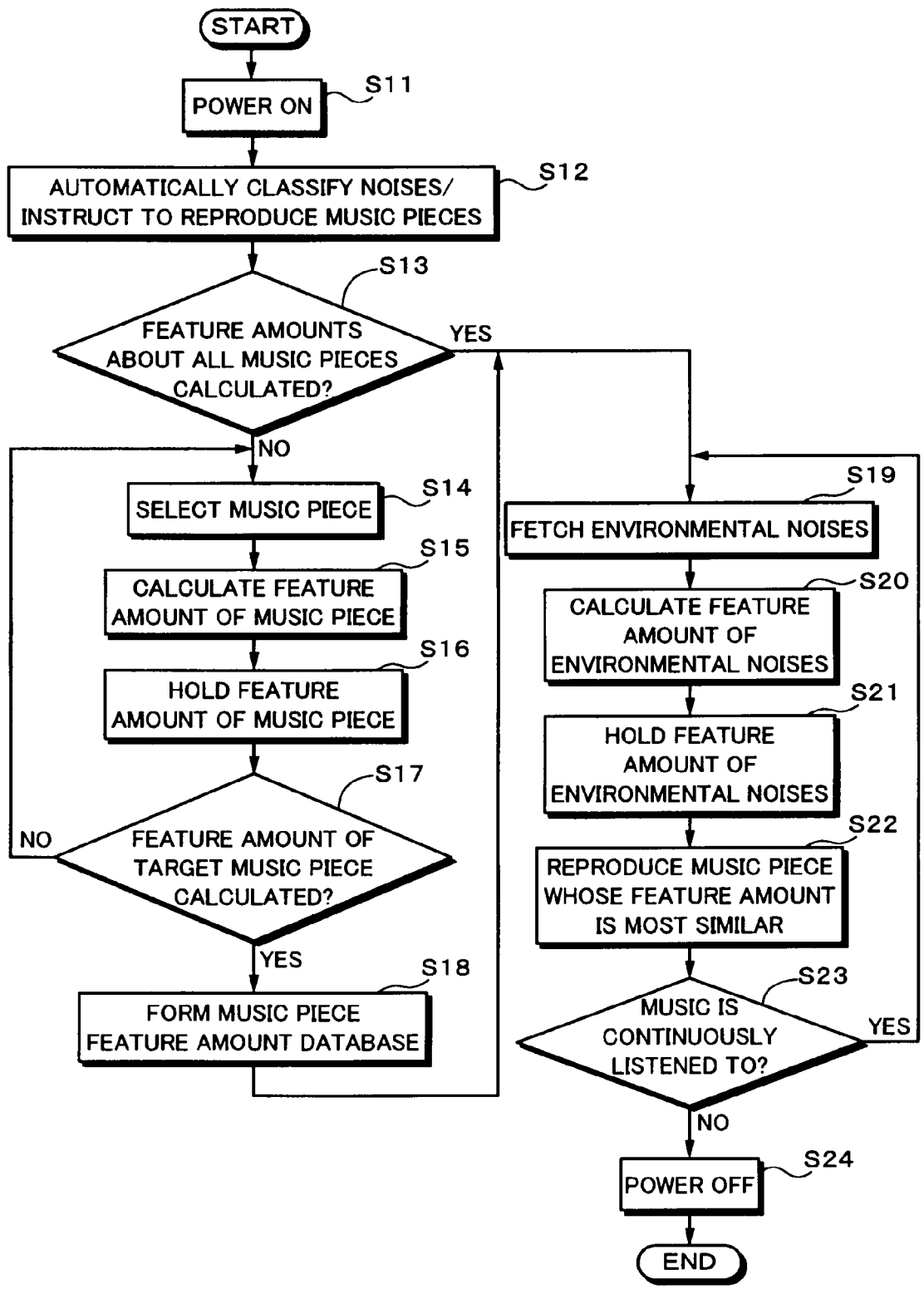
FIG. 14 is a flowchart for explaining a selecting method of music pieces in the second embodiment of the invention.

A selecting method of the music pieces in the second embodiment of the invention will be described with reference to a flowchart shown in FIG. 14. It is assumed that the following processes are executed under control of the CPU 11 unless otherwise specified. The power source of the music reproducing apparatus 1 is turned on in step S11. An operation knob which is provided for the operation unit 17 and is used to instruct the reproduction of the music pieces according to the ambient environmental noises is operated by the user in step S12.

In step S13, whether or not the feature amounts have been calculated and recorded in the music piece feature amount database 57 with respect to all of the music pieces recorded in the music reproducing apparatus 1 is discriminated. If it is decided that the feature amounts are not calculated yet with respect to all of the music pieces, the processing routine advances to step S14 and the music piece serving as a target of the calculation of the feature amounts is selected. If it is decided that the feature amounts have been calculated with respect to all of the music pieces, the processing routine advances to step S19.

In step S15, the frequency analysis is performed to the music piece data MT of the selected music piece and the envelope information MPe and power information MPp as feature amounts of the music piece are calculated. In step S16, the calculated envelope information MPe and power information MPp are held.

In step S17, whether or not the feature amounts have been calculated with respect to all of the music pieces serving as targets of the calculation of the feature amounts is discriminated. If it is decided that the feature amounts of all of the music pieces serving as targets of the calculation of the feature amounts have been calculated, the processing routine advances to step S18 and the calculated feature amounts are recorded into the music piece feature amount database 57. If it is determined that the feature amounts of all of the music pieces serving as targets of the calculation of the feature amounts are not calculated yet, the processing routine is returned to step S14 and another music piece serving as a target of the calculation of the feature amounts is selected.

In step S19, the environmental noises are collected through the mic 20 and the noise data NT of the environmental noises is supplied to the CPU 11. In step S20, the frequency analysis is performed to the noise data NT of the collected environmental noises and the envelope information NPe and power information NPp as feature amounts of the environmental noises are calculated. In step S21, the calculated envelope information NPe and power information NPp are held.

In step S22, the distances of the feature amounts are calculated by the above equation (2) by using the envelope information NPe and power information NPp of the noise data NT and the envelope information MPe and power information MPp of the music piece data MT recorded in the music piece feature amount database 57. The music piece in which the calculated distance is shortest among the calculated distances is selected as a music piece in which the feature amounts are most similar. The music piece data corresponding to the selected music piece is read out of the recording medium 18 and reproduced.

In step S23, whether or not the music is continuously listened to when the reproduced music piece is finished is discriminated. If it is determined that the music is continuously listened to, the processing routine is returned to step S19 and the environmental noises are collected again through the mic 20.

In the case of continuously listening to the music piece, when the environmental noises do not change at all times or when a change in environmental noises is small, there is a risk that the same music piece as the previous one will have been selected on the assumption that the similarity degree between the environmental noises and the music piece is largest. In such a case, therefore, it is preferable to construct the apparatus in such a manner that by setting so that the music piece which has once been selected is not selected a predetermined number of times, such a situation that the same music piece is continuously reproduced is prevented, and the music piece having the second largest similarity degree is selected.

If it is determined in step S23 that the music is not continuously listened to, the processing routine advances to step S24. The power source of the music reproducing apparatus 1 is turned off by the user and a series of processes is finished.

Although an explanation has been made on the assumption that when the reproduction of the music piece according to the ambient environmental noises is instructed in step S12, the feature amounts of the music piece data MT are calculated and recorded into the music piece feature amount database 57 in this example, the invention is not limited to such an example. For instance, it is also possible to construct the apparatus in such a manner that when a new music piece has been recorded into the recording medium 18 of the music reproducing apparatus 1, the feature amounts of the music piece are calculated and recorded into the music piece feature amount database 57.

As mentioned above, in the second embodiment of the invention, the feature amounts of the environmental noises and the music pieces are extracted by using the same method and the music piece in which the feature amounts are most similar is selected. Therefore, the number of operations such as a volume operation and the like which are executed by the user can be minimized and the music pieces can be listened to without being drowned out by the noises.

As a selecting method of the music piece according to the second embodiment of the invention, besides the method of selecting the music piece in which the similarity degree of the feature amounts of the environmental noises and the music piece is largest, a method of selecting the music piece in which the similarity degree of the feature amounts of the environmental noises and the music piece is smallest is considered.

Figure 15:
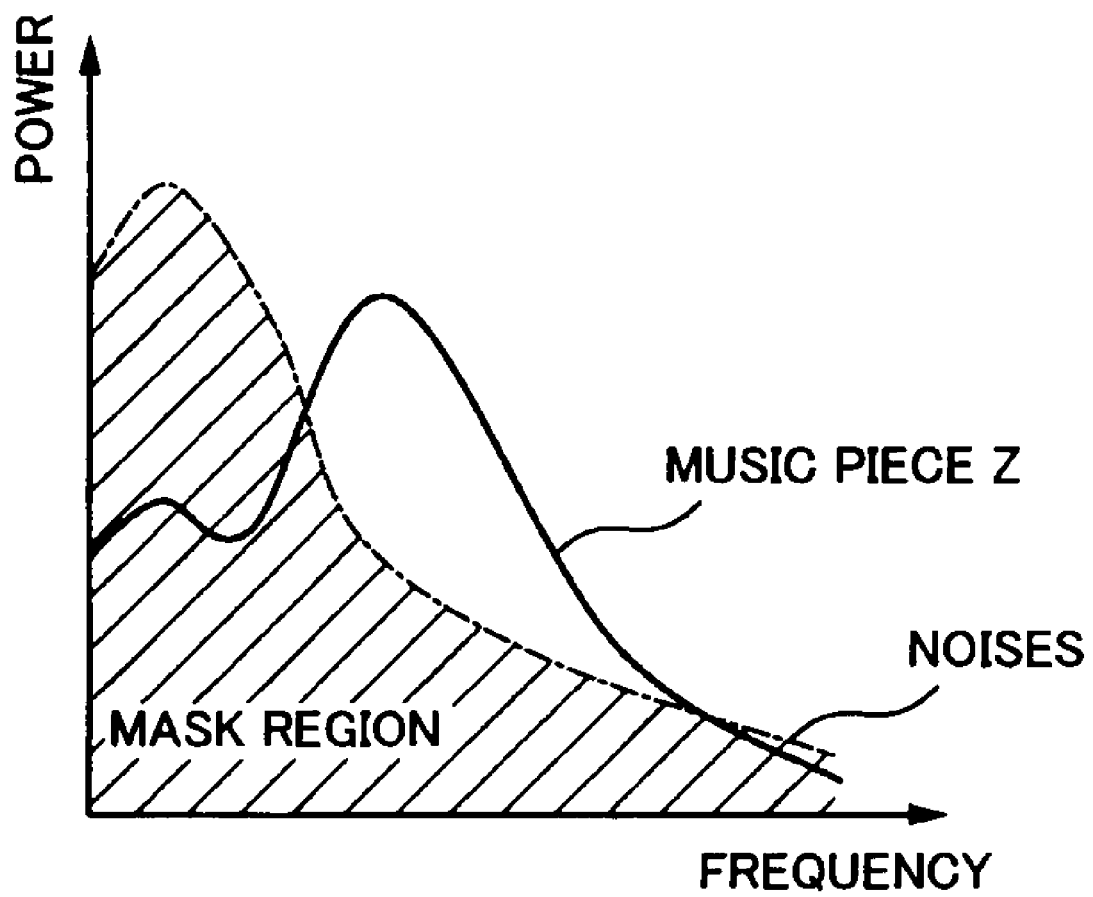
FIG. 15 is a schematic diagram showing frequency characteristics of the environmental noises and further another music piece.

For example, a case of listening to a music piece Z under predetermined environmental noises will now be considered. FIG. 15 shows frequency characteristics of the environmental noises and the music piece Z. In this case, a shape of the envelope of the music piece Z is largely different from a shape of the envelope of the environmental noises and a region which is masked by the environmental noises is small. Frequency components having the largest power in the music piece Z which are regarded as a principal portion of the music piece Z are not masked by the environmental noises. Therefore, it is considered that the music piece Z can be listened to without raising the volume.

Therefore, even by selecting the music piece in which a similarity degree between the environmental noises and the music piece is small, that is, the music piece in which the shapes of the envelopes of the environmental noises and the music piece differ, the proper music piece can be listened to under the environmental noises.

Figure 16:
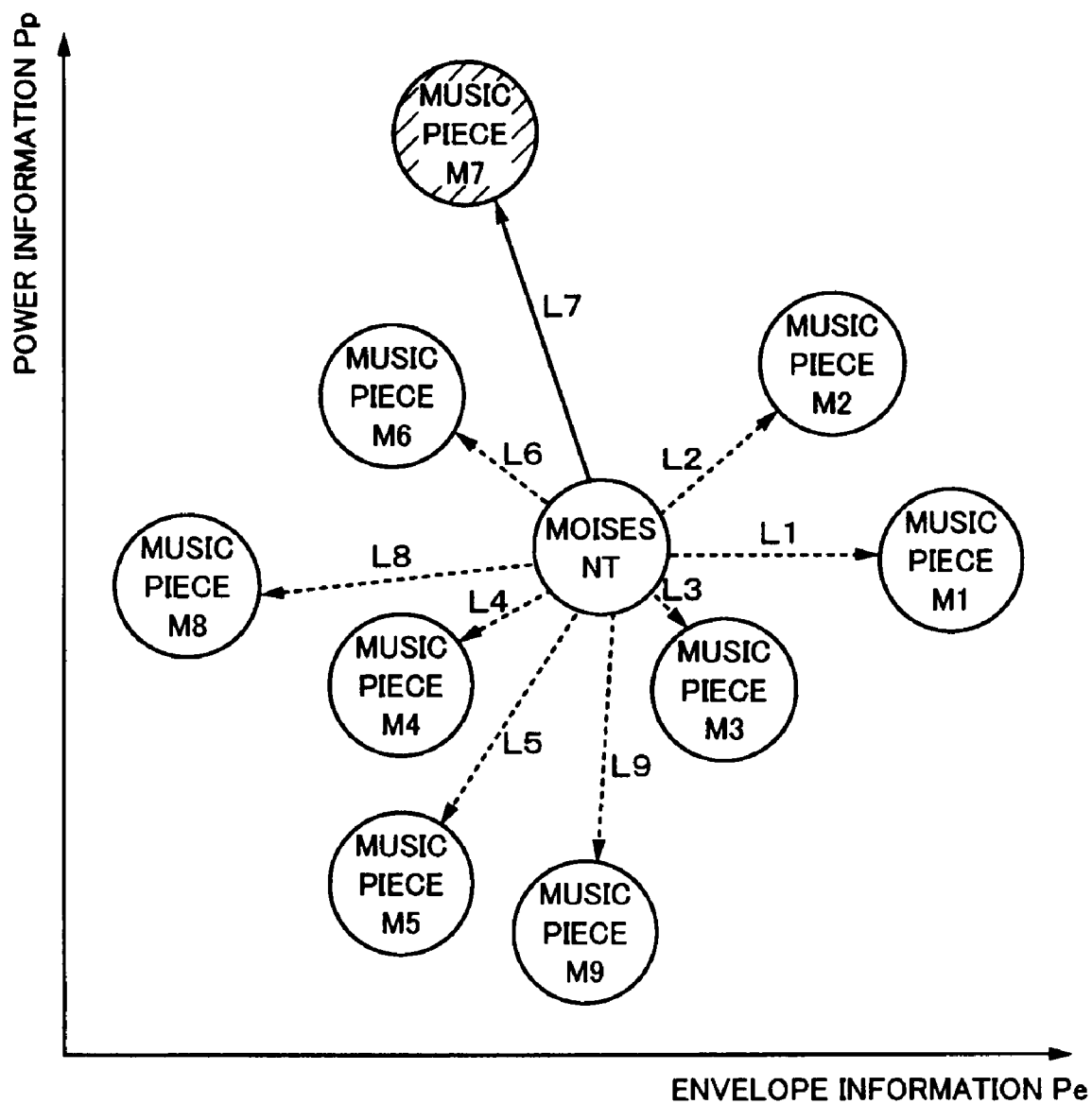
FIG. 16 is a schematic diagram for explaining a similarity degree of noise data and music piece data.

FIG. 16 shows an example in which the noise data NT of the environmental noises collected by the mic 20 and the music piece data M1 to M9 of the music pieces recorded in the music reproducing apparatus 1 have been mapped onto the 2-dimensional plane of the envelope information Pe and power information Pp as feature amounts.

In such a case, it is considered that the case where the similarity degree of the environmental noises and the music piece is smallest is a case where the difference between their feature amounts is maximum. That is, the music piece of the music piece data in which the distance L from the environmental noises is longest is a music piece in which a similarity degree between the environmental noises and the music piece is smallest. Therefore, by calculating the distance between the environmental noises and the music piece on the basis of the equation (2), the music piece in which a similarity degree between the environmental noises and the music piece is smallest can be selected.

In this example, as a result obtained by calculating the distances L1 to L9 between the noise data NT and the music piece data M1 to M9 on the basis of the equation (2), it is determined that the distance L7 between the noise data NT and the music piece data M7 is longest. Therefore, the music piece of the music piece data M7 is selected as a music piece which is most similar to the environmental noises.

In the second embodiment of the invention, the mic 20 may be provided out of the headphones 2 or can be also provided for the casing or the like of the music reproducing apparatus 1 in a manner similar to the foregoing first embodiment.

Subsequently, the third embodiment of the invention will be described. In the third embodiment of the invention, a noise cancelling function for reducing the noises is applied to the foregoing first embodiment. The environmental noises to which the noise cancellation was performed and in which the noises have been reduced are classified and the category of the music pieces is automatically selected in accordance with a classification result.

Figure 17:
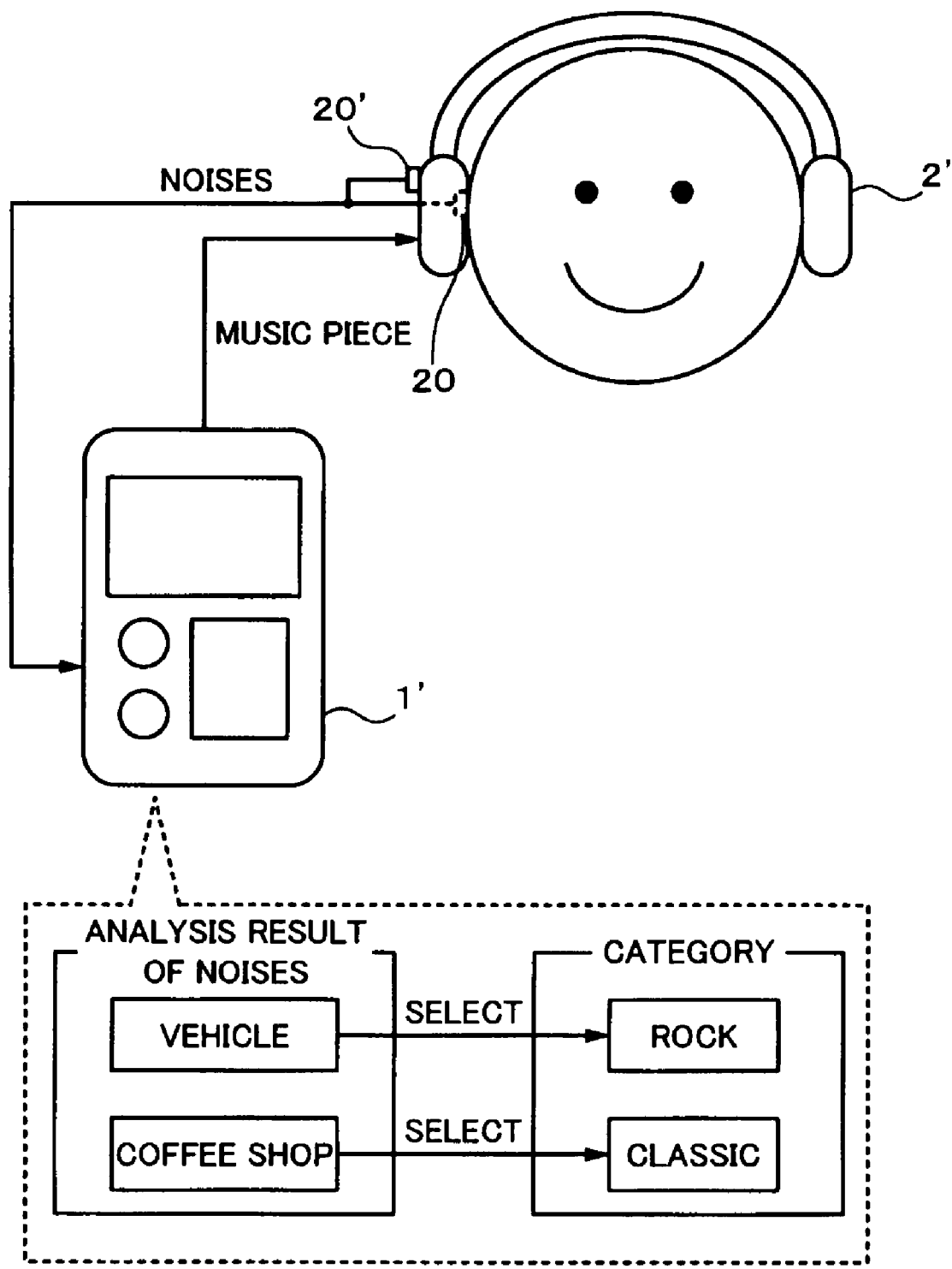
FIG. 17 is a schematic diagram showing a using form of an example of a music reproducing apparatus which can be applied to the third embodiment of the invention.

FIG. 17 shows a using form of an example of a music reproducing apparatus 1' which can be applied to the third embodiment of the invention. In the example shown in FIG. 17, a state where the mic 20 or a mic 20' and headphones 2' are connected to the music reproducing apparatus 1' and the user is listening to the music pieces recorded in the music reproducing apparatus 1' through the headphones 2' is illustrated.

The music reproducing apparatus 1' has the noise cancelling function. When the noise cancelling function is turned on, the music reproducing apparatus 1' executes the noise cancellation to the environmental noises collected by the mic 20 or the mic 20', thereby reducing the environmental noises which are heard to the user. The mic 20 is provided, for example, in the headphones 2' and collects the environmental noises which are heard to the user at the position of the ear in a state where the headphones 2' have been put on his head. The mic 20' is provided, for example, out of the headphones 2'.

Although the noise cancelling function can be turned on or off, since the operation in the case of turning off the noise cancelling function is similar to that in the foregoing first embodiment, the case where the noise cancelling function is turned on will be described here.

When the user instructs the music reproducing apparatus 1' to select the music pieces according to the environmental noises, the music reproducing apparatus 1' collects the ambient environmental noises by the mic 20 or the mic 20'. When the noise cancelling function is ON, after a noise reducing process by the noise cancelling function was executed, the environmental noises in which the noises have been reduced are analyzed. The music reproducing apparatus 1' selects the corresponded category of the music pieces on the basis of an analysis result of the environmental noises in which the noises have been reduced and reproduces the music pieces classified into the selected category. If the noise cancelling function is OFF, the noise reducing process of the environmental noises is not executed.

In the case of using the mic 20 provided in the headphones 2', the mic 20 collects the environmental noises at the position of the user's ear. Therefore, when the noise cancelling function is ON, the environmental noises which are collected by the mic 20 are environmental noises in which the noises have been reduced by the noise cancelling function.

In the case of using the mic 20' provided out of the headphones 2', the mic 20' collects the environmental noises at a position different from the position of the user's ear. Therefore, even when the noise cancelling function is ON, the environmental noises which are collected by the mic 20' are not the environmental noises in which the noises have been reduced by the noise cancelling function.

Since the state of the environmental noises which are collected in the case where the mic 20 provided in the headphones 2' is used and that in the case where the mic 20' provided out of the headphones 2' is used are different as mentioned above, it is necessary to use the different classifying methods for the respective environmental noises.

First, the classifying method of the environmental noises in the case where the mic 20 provided in the headphones 2' will be described. As mentioned above, in the case of using the mic 20 provided in the headphones 2', the environmental noises at the position of the user's ear are collected. Therefore, when the noise cancelling function is turned on, the environmental noises which are collected by the mic 20 are in a noise reduced state similar to that of the environmental noises which are heard to the user.

Therefore, by classifying the environmental noises which have been collected by the mic 20 and in which the noises have been reduced, the category of the music pieces according to the environmental noises which are heard to the user can be selected.

Figure 18:
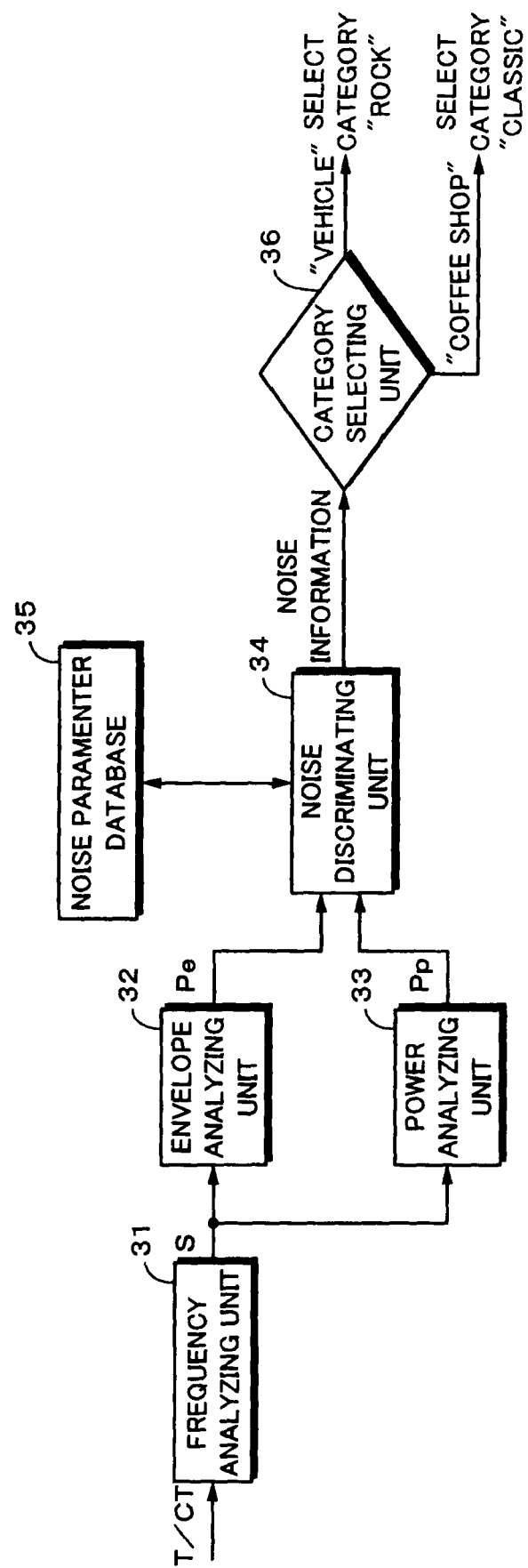
FIG. 18 is a block diagram for explaining an example of a classifying method of environmental noises in the case where a microphone provided in headphones is used.

FIG. 18 is a block diagram for explaining an example of the classifying method of the environmental noises. The classification of the environmental noises shown in FIG. 18 is performed by the CPU 11. In this case, by executing a process similar to that in the foregoing first embodiment, the environmental noises can be classified. Therefore, portions similar to those in the foregoing first embodiment are designated by the same reference numerals and their explanation is omitted here. When the noise cancelling function is ON, the mic 20 collects noise data CT of the environmental noises in which the noises have been reduced (hereinbelow, properly referred to as reduction noise data CT). When the noise cancelling function is OFF, the mic 20 collects the noise data T of the environmental noises. The collected noise data T or reduction noise data CT is supplied to the frequency analyzing unit 31.

The frequency analyzing unit 31 supplies the frequency information S obtained by performing the frequency analysis to the inputted noise data T or reduction noise data CT to the envelope analyzing unit 32 and the power analyzing unit 33. The envelope analyzing unit 32 and the power analyzing unit 33 calculate the envelope information Pe and the power information Pp on the basis of the frequency information S and supply to the noise discriminating unit 34, respectively. The noise discriminating unit 34 classifies the environmental noises by referring to the noise parameter database 35 on the basis of the envelope information Pe and the power information Pp, forms the noise information showing a classification result, and supplies to the category selecting unit 36.

The category selecting unit 36 selects the category of the music pieces corresponding to the classification of the environmental noises on the basis of the noise information supplied from the noise discriminating unit 34. The music pieces are selected by a predetermined selecting method from the music pieces classified into each category and are reproduced.

Figure 19:
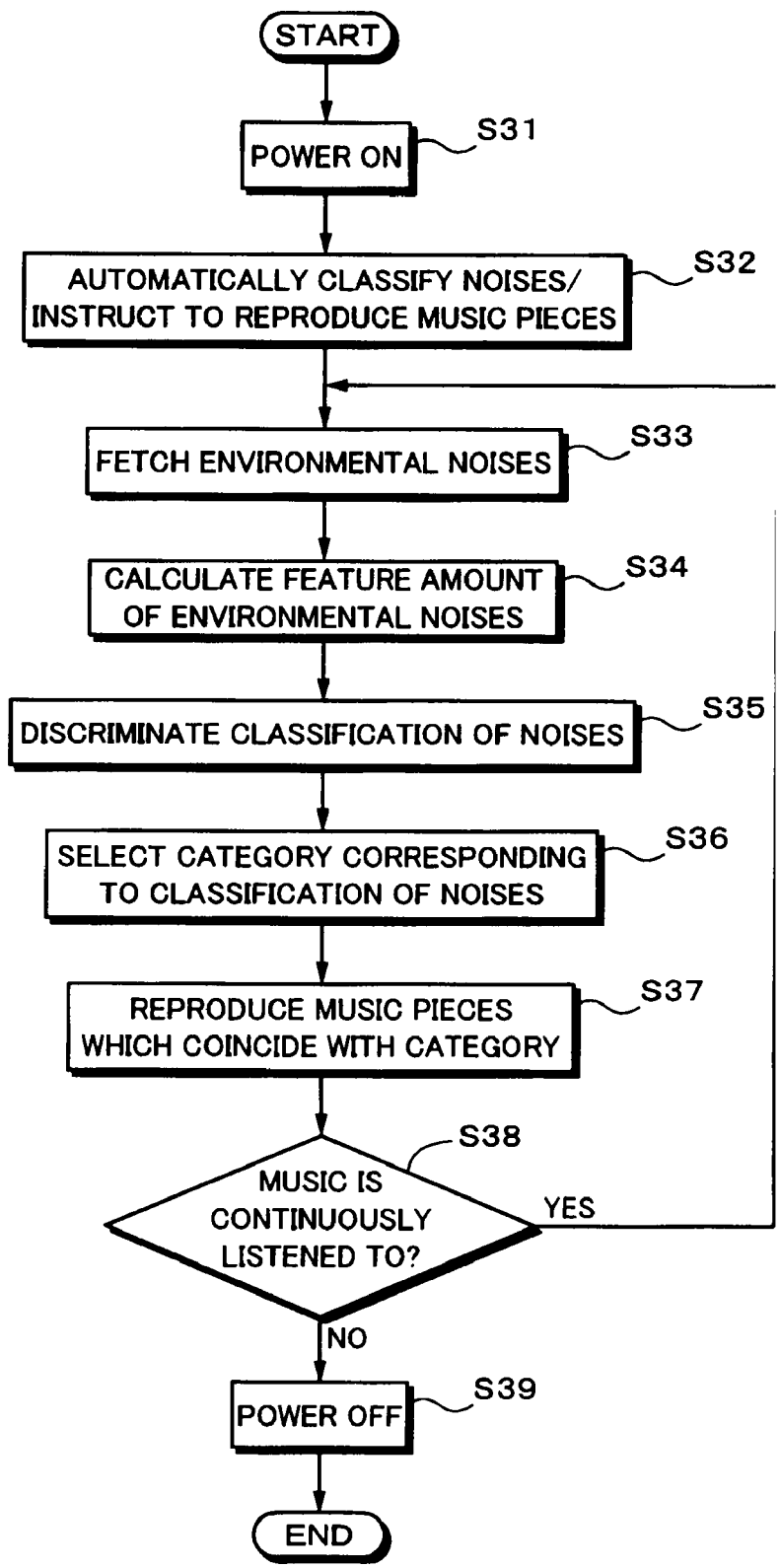
FIG. 19 is a flowchart for explaining a selecting method of a category of music pieces in the case where the microphone provided in the headphones is used.

The selecting method of the category of the music pieces in the case where the environmental noises have been collected by using the mic 20 will now be described with reference to a flowchart shown in FIG. 19. It is assumed that the following processes are executed under control of the CPU 11 unless otherwise specified.

In step S31, a power source of the music reproducing apparatus 1' is turned on. When the reproduction of the music pieces according to the ambient environmental noises is instructed by the user in step S32, the environmental noises are collected through the mic 20 and the noise data T of the environmental noises or the reduction noise data CT to which the noise cancellation was performed is supplied to the CPU 11 in step S33.

In step S34, the frequency analysis is performed to the noise data T of the collected environmental noises or the reduction noise data CT and the envelope information Pe and power information Pp as feature amounts are calculated. In step S35, the environmental noises are classified with reference to the noise parameter database on the basis of the calculated envelope information Pe and power information Pp.

In step S36, the corresponded category of the music pieces is selected on the basis of the classification result of the environmental noises. In step S37, predetermined music pieces are selected from the music pieces corresponding to the selected category and the corresponding music piece data is read out of the recording medium 18 and reproduced.

In step S38, when the reproduced music pieces are finished, whether or not the user continues to listen to the music is discriminated. If it is determined that the user continues to listen to the music, the processing routine is returned to step S33 and the environmental noises are collected again through the mic 20. If it is determined in step S38 that the user does not continue to listen to the music, the processing routine advances to step S39. The power source of the music reproducing apparatus 1' is turned off by the user and a series of processes is finished.

Subsequently, the classifying method of the environmental noises in the case where the mic 20' is provided out of the headphones 2' will be described. As mentioned above, in the case where the mic 20' provided out of the headphones 2' is used, the environmental noises at a position different from the position of the user's ear are collected. Therefore, when the noise cancelling function is turned on, although the environmental noises which are heard to the user are reduced, the environmental noises which are collected by the mic 20' are noises in a state where the noises are not reduced.

As mentioned above, even when the collected environmental noises are classified, since the environmental noises which are actually heard to the user and the environmental noises collected by the mic 20' differ, there is a risk that it is difficult to select the category of the music pieces corresponding to the environmental noises which are heard to the user.

In such a case, therefore, the classification is performed to the noise-reduced environmental noises obtained by executing such a process as to obtain the environmental noises which are equivalent to those in the case where the noise cancelling function is ON to the collected environmental noises.

Figure 20:
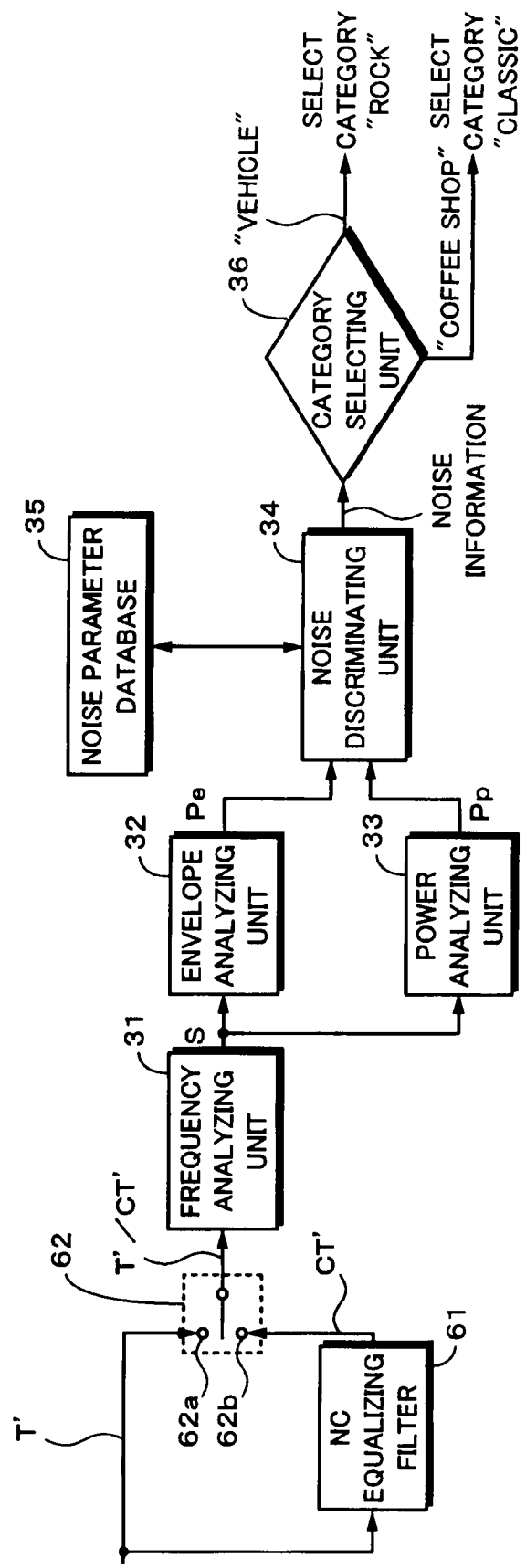
FIG. 20 is a block diagram for explaining an example of a classifying method of the environmental noises in the case where a microphone provided out of the headphones is used.

FIG. 20 is a block diagram for explaining an example of the classifying method of the environmental noises. The classification of the environmental noises shown in FIG. 20 is performed by the CPU 11. Portions similar to those in the foregoing first embodiment are designated by the same reference numerals and their detailed explanation is omitted here. Noise data T' of the environmental noises collected by the mic 20' is supplied to an equalizing filter 61 and one input terminal 62a of a selecting unit 62.

The equalizing filter 61 executes such a process as to obtain an effect similar to the noise reducing effect which is obtained when the noise cancelling function is used to the noise data T' of the collected environmental noises, thereby forming reduction noise data CT' in which the noises have been reduced. The formed reduction noise data CT' is supplied to the other input terminal 62b of the selecting unit 62.

The selecting unit 62 selects one of the input terminals 62a and 62b under the control of the CPU 11 and supplies the data supplied to the selected input terminal to the frequency analyzing unit 31. For example, when the noise cancelling function is OFF, the input terminal 62a is selected and the noise data T' is supplied to the frequency analyzing unit 31. When the noise cancelling function is ON, the input terminal 62b is selected and the reduction noise data CT' is supplied to the frequency analyzing unit 31.

The frequency analyzing unit 31 supplies the frequency information S obtained by performing the frequency analysis to the inputted noise data T' or reduction noise data CT' to the envelope analyzing unit 32 and the power analyzing unit 33.

The envelope analyzing unit 32 and the power analyzing unit 33 calculate the envelope information Pe and the power information Pp on the basis of the frequency information S and supplies to the noise discriminating unit 34, respectively. The noise discriminating unit 34 classifies the environmental noises with reference to the noise parameter database 35 on the basis of the envelope information Pe and the power information Pp, forms noise information showing a classification result, and supplies to the category selecting unit 36.

The category selecting unit 36 selects the category of the music pieces corresponding to the classification of the environmental noises on the basis of the noise information supplied from the noise discriminating unit 34. The music pieces are selected by a predetermined selecting method from the music pieces classified into each category and are reproduced.

It is not always necessary to make the noise reducing effect to the noise data T' by the equalizing filter 61 perfectly coincide with the noise reducing effect by the noise cancelling function. In this instance, it is unnecessary to accurately reconstruct the reduced environmental noises but it is sufficient to reconstruct them to such an extent that how the feature amounts of the environmental noises were changed on the whole by the noise cancelling function can be known.

Figure 21:
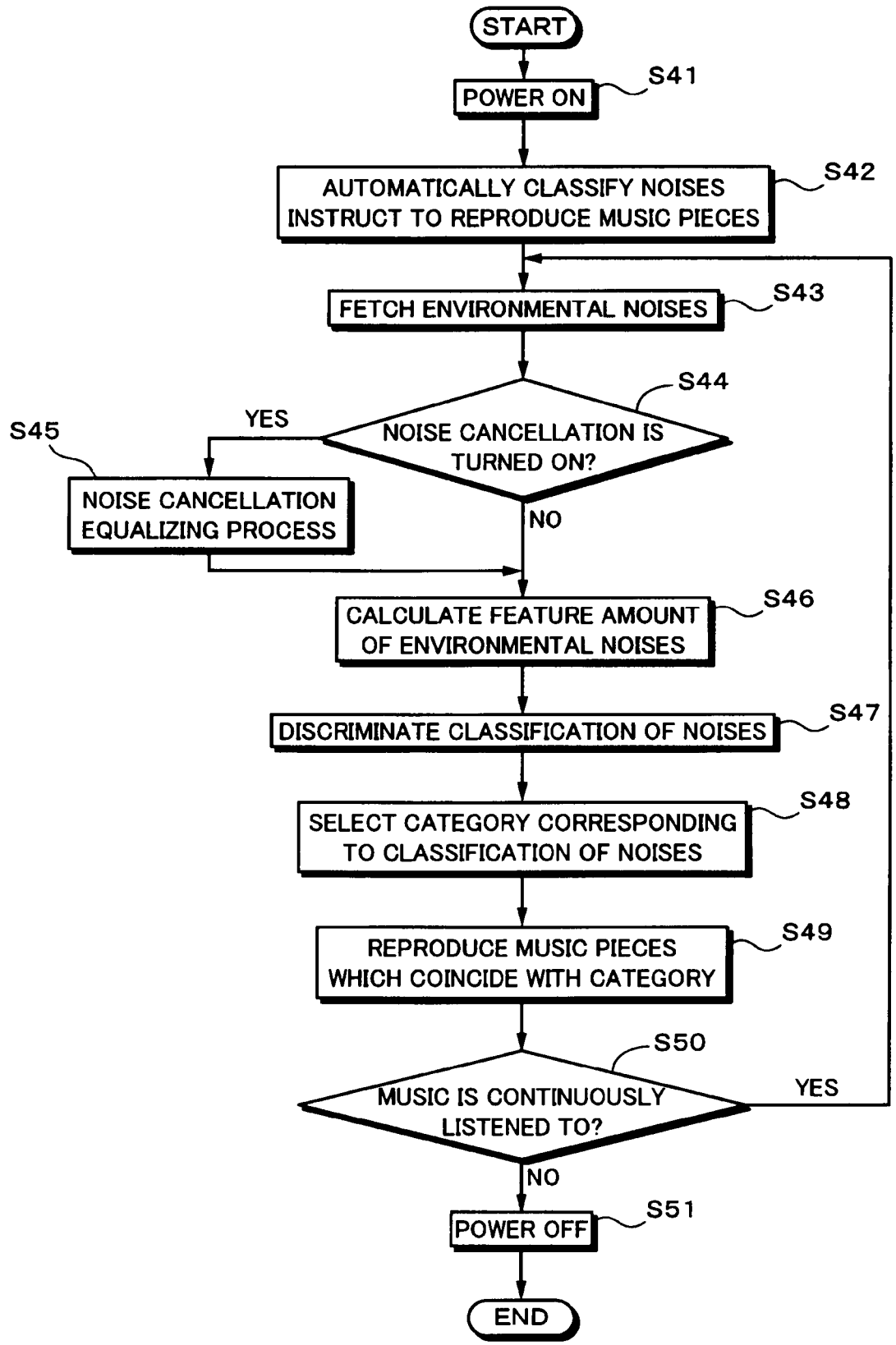
FIG. 21 is a flowchart for explaining a selecting method of a category of music pieces in the case where the microphone provided out of the headphones is used.
Figure 22:
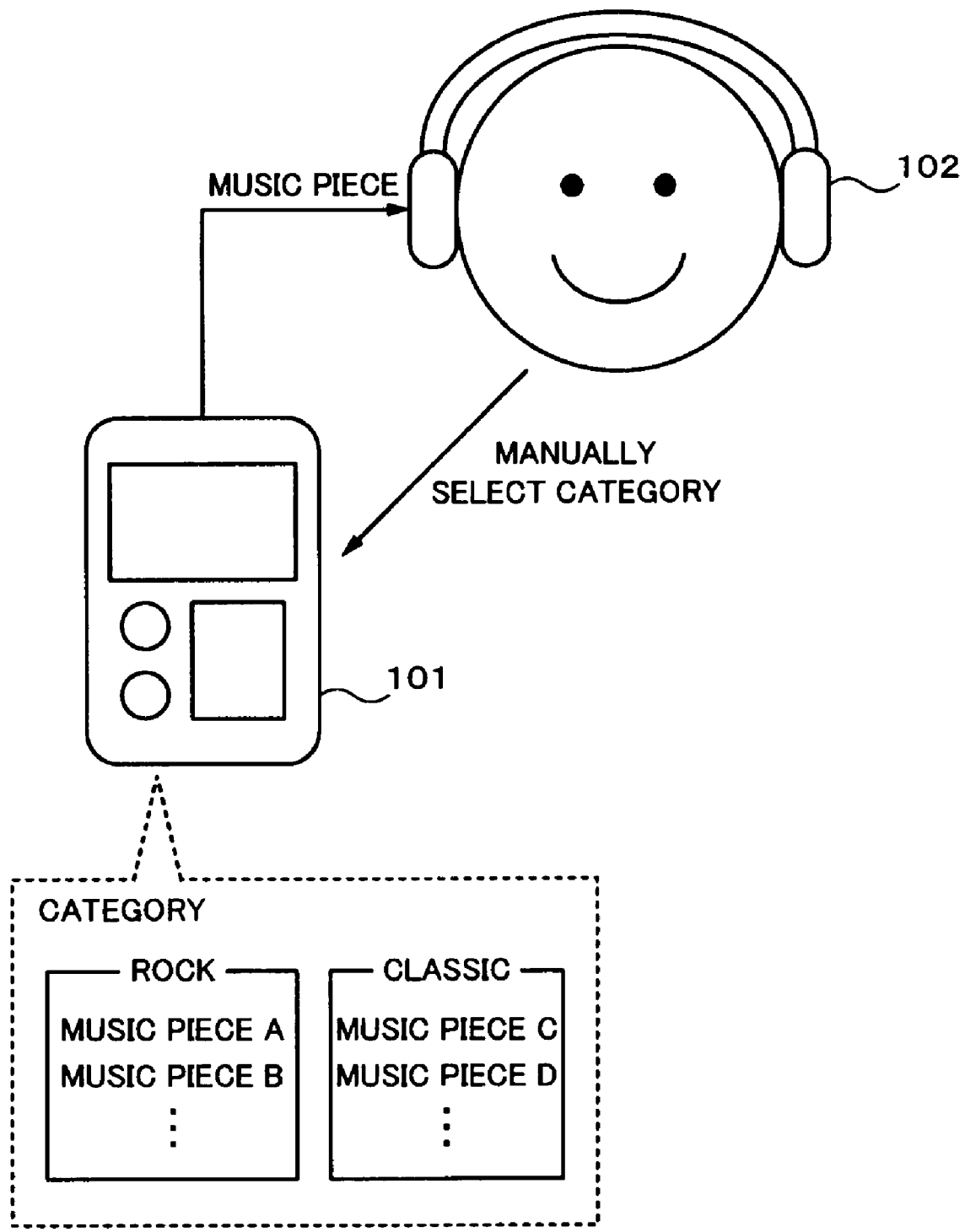
FIG. 22 is a schematic diagram showing a using form of an example of a music reproducing apparatus in the related art.
Figure 23:
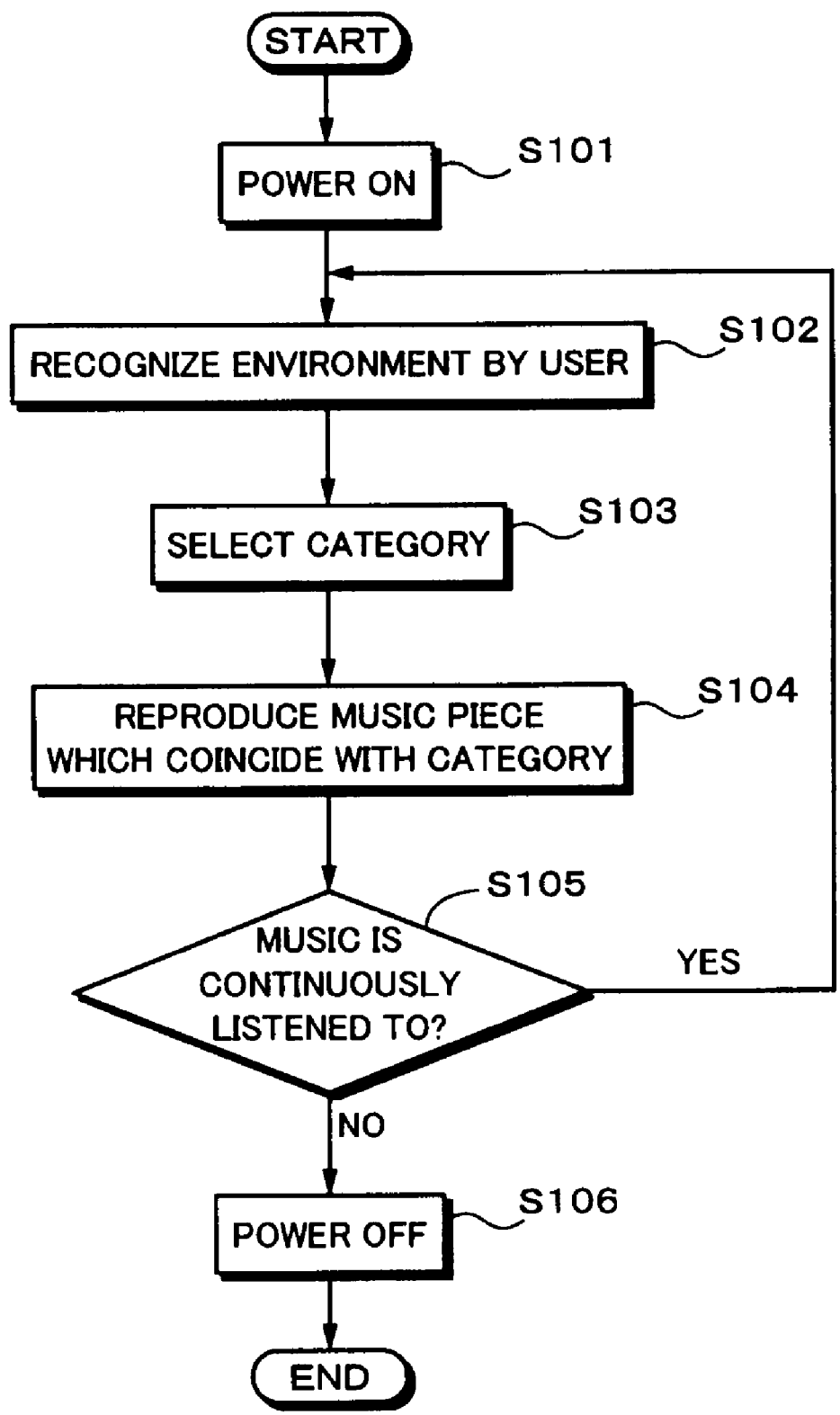
FIG. 23 is a flowchart for explaining a selecting method of a category of music pieces in the music reproducing apparatus in the related art.

The selecting method of the category of the music pieces in the case where the environmental noises have been collected by using the mic 20' will now be described with reference to a flowchart shown in FIG. 21. It is assumed that the following processes are executed under control of the CPU 11 unless otherwise specified.

In step S41, the power source of the music reproducing apparatus 1' is turned on. When the reproduction of the music pieces according to the ambient environmental noises is instructed by the user in step S42, the environmental noises are collected through the mic 20' and the noise data T' of the environmental noises is supplied to the CPU 11 in step S43.

In step S44, whether or not the noise cancelling function is ON is discriminated. If the noise cancelling function is ON, the processing routine advances to step S45. If the noise cancelling function is OFF, the processing routine advances to step S46. In step S45, such a process as to obtain an effect similar to the noise reducing effect obtained when the noise cancellation has been performed to the noise data T' of the collected environmental noises is executed, so that the reduction noise data CT' of the environmental noises in which the noises have been reduced is formed.

In step S46, the frequency analysis is performing to the noise data T' of the collected environmental noises or the reduction noise data CT' and the envelope information Pe and power information Pp as feature amounts are calculated. In step S47, the environmental noises are classified with reference to the noise parameter database on the basis of the calculated envelope information Pe and power information Pp.

In step S48, the corresponded category of the music pieces is selected on the basis of a classification result of the environmental noises. In step S49, predetermined music pieces are selected from the music pieces corresponding to the selected category and the corresponding music piece data is read out of the recording medium 18 and reproduced.

In step S50, when the reproduced music pieces are finished, whether or not the user continues to listen to the music is discriminated. If it is determined that the user continues to listen to the music, the processing routine is returned to step S43 and the environmental noises are collected again through the mic 20'. If it is determined in step S50 that the user does not continue to listen to the music, the processing routine advances to step S51. The power source of the music reproducing apparatus 1' is turned off by the user and a series of processes is finished.

As mentioned above, in the third embodiment of the invention, by applying the noise cancelling function or a process equivalent to the noise cancellation to the collected environmental noises, the environmental noises at the time of listening to the music pieces are reduced. The present environment is discriminated on the basis of the feature amounts extracted from the environmental noises in which the noises have been reduced. The pre-corresponded category of the music pieces is selected on the basis of a discrimination result. Therefore, the proper music pieces according to the environment can be automatically selected.

Even in the environment of a high noise level such as an inside of "vehicle" or the like, the music pieces which have not been suitable for the environmental noises in the related art, for example, such music pieces that the environmental noises are classified into the environment of a low noise level such as "coffee shop" or the like and are classified into the category of "classic" or the like can be listened to.

Although the case where the noise cancelling function was applied to the foregoing first embodiment has been described in the third embodiment of the invention, the invention is not limited to such an example. For instance, the noise cancelling function may be applied to the foregoing second embodiment. In such a case, the feature amounts of the environmental noises in which the noises have been reduced by the noise cancelling function and the feature amounts of the music piece are compared and the music piece in which the similarity degree between those feature amounts is highest or lowest is selected. By this method, the user can listen to the music pieces suitable for the environment.

Although the first embodiment of the invention, the modification of the first embodiment, and the second and third embodiments have been described above, the invention is not limited to the first embodiment of the invention, the modification of the first embodiment, and the second and third embodiments mentioned above but various modifications, combinations, sub-combinations and alterations may occur depending on design requirements and other factors insofar as they are within the scope of the appended claims or the equivalents thereof. Although the frequency analysis has been used as an analyzing method for the environmental noises in the foregoing examples, the invention is not limited to such an example. For instance, a time waveform may be analyzed.

Although the case where, for example, the envelope and power were used as feature amounts of the environmental noises has been described above, the invention is not limited to such an example but other feature amounts may be used. The invention is not limited to those two feature amounts but the environmental noises may be classified on the basis of three or more feature amounts.

Although the explanation has been made in the above example on the assumption that the environmental noises were classified into "vehicle" and "coffee shop", the invention is not limited to such an example. For instance, the environmental noises may be classified into three or more categories. Furthermore, the category of the music pieces is not limited to "rock" and "classic" but the environmental noises may be classified into any other category. For example, the environmental noises may be classified into "cheerful music piece", "calm music piece", or the like in accordance with a mood of the user.

What is claimed is:

1. A music piece reproducing apparatus comprising:
    a sound collecting unit collecting noise data of an ambient environment;
    an analyzing unit performing a frequency analysis to the noise data collected by said sound collecting unit and extracting a feature amount showing a feature of said noise data;
    a noise parameter database classifying the noise data of at least one of a plurality of environments; and
    a reproducing unit reproducing music piece data which has been recorded in a recording medium and classified in at least one of a plurality of categories,
    wherein said analyzing unit
        classifies said noise data with reference to said noise parameter database on the basis of the extracted feature amount of said noise data,
        selects a previously-corresponded category of music pieces in accordance with a classification result of said noise data,
        selects predetermined music piece data from music piece data classified into said selected category,
            has a memory storing the classification result of said noise data a predetermined number of times,
            performs said classification to said noise data every predetermined time, and classifies said noise data on the basis of an average of the classification results of said predetermined number of times stored in said memory, and
        performs a convolution operation such that weight coefficients progressively decrease as the classification results of the predetermined number of times becomes older in time, and classifies said noise data on the basis of the average of the classification results of said noise data of said predetermined number of times to which said weight coefficients have been convolved.

2. The music piece reproducing apparatus according to claim 1, wherein said analyzing unit extracts an inclination of an envelope in a predetermined frequency region of said music piece data as said feature amount.

3. The music piece reproducing apparatus according to claim 1, wherein said analyzing unit extracts a sum of powers in a predetermined frequency region of said music piece data as said feature amount.

4. The music piece reproducing apparatus according to claim 1, wherein said analyzing unit further performs a time waveform analysis to the noise data collected by said sound collecting unit and extracts the feature amount of said noise data.

5. The music piece reproducing apparatus according to claim 1, further comprising a noise reducing unit reducing a noise level of the noise data collected by said sound collecting unit, and
    wherein said analyzing unit performs the frequency analysis to the noise data in which noises have been reduced by said noise reducing unit.

6. The music piece reproducing apparatus according to claim 5, further comprising an audio output unit outputting the music piece data reproduced by said reproducing unit, and
    wherein said sound collecting unit is provided in said audio output unit.

7. The music piece reproducing apparatus according to claim 5, further comprising an audio output unit outputting the music piece data reproduced by said reproducing unit, and
    wherein said sound collecting unit is provided out of said audio output unit.

8. A music piece reproducing method comprising:
a sound collecting step of collecting noise data of an ambient environment;
an analyzing step of performing a frequency analysis to the noise data collected by said sound collecting step and extracting a feature amount showing a feature of said noise data; and
a reproducing step of reproducing music piece data which has been recorded in a recording medium and classified in at least one of a plurality of categories,
wherein in said analyzing step,
said noise data is classified on the basis of the extracted feature amount of said noise data with reference to a noise parameter database for classifying the noise data in at least one of a plurality of categories,
selects a previously-corresponded category of music pieces in accordance with a classification result of said noise data,
selects predetermined music piece data from music piece data classified into said selected category,
wherein stores in a storage device a classification result of said noise data a predetermined number of times,
performs said classification to said noise data every predetermined time,
classifies said noise data on the basis of an average of the classification results of said predetermined number of times stored in said storage device,
performs a convolution operation such that weight coefficients progressively decrease as the classification results of the predetermined number of times becomes older in time, and
classifies said noise data on the basis of the average of the classification results of said noise data of said predetermined number of times to which said weight coefficients have been convolved.

* * * * *